United States Patent
Lin et al.

(10) Patent No.: US 9,482,844 B2
(45) Date of Patent: Nov. 1, 2016

(54) IMAGING LENS SYSTEM, IMAGE CAPTURING DEVICE AND ELECTRONIC DEVICE

(71) Applicant: LARGAN PRECISION CO., LTD., Taichung (TW)

(72) Inventors: Cheng-Chen Lin, Taichung (TW); Hsiang-Chi Tang, Taichung (TW); Kuan-Ming Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 30 days.

(21) Appl. No.: 14/564,589

(22) Filed: Dec. 9, 2014

(65) Prior Publication Data
US 2016/0109686 A1    Apr. 21, 2016

(30) Foreign Application Priority Data

Oct. 20, 2014    (TW) .............................. 103136110 A

(51) Int. Cl.
| | | |
|---|---|---|
| G02B 13/00 | (2006.01) | |
| G02B 13/18 | (2006.01) | |
| G02B 9/60 | (2006.01) | |
| H04N 5/225 | (2006.01) | |

(52) U.S. Cl.
CPC ............ G02B 13/0045 (2013.01); G02B 9/60 (2013.01); G02B 13/18 (2013.01); H04N 5/2253 (2013.01); H04N 5/2254 (2013.01)

(58) Field of Classification Search
CPC .... G02B 13/0045; G02B 9/60; G02B 13/18; H04N 5/225
USPC ......................................... 359/714, 763–764
See application file for complete search history.

(56) References Cited

U.S. PATENT DOCUMENTS

| | | | | |
|---|---|---|---|---|
| 8,305,697 B1* | 11/2012 | Chen | ................ | G02B 13/0045 359/714 |
| 2010/0315723 A1 | 12/2010 | Noda | | |
| 2011/0249346 A1* | 10/2011 | Tang | ................ | G02B 13/0045 359/764 |
| 2012/0287513 A1* | 11/2012 | Hsu | .................... | G02B 13/0045 359/714 |
| 2013/0279022 A1* | 10/2013 | Tang | ................ | G02B 13/0045 359/714 |
| 2014/0063596 A1 | 3/2014 | Jung et al. | | |

(Continued)

FOREIGN PATENT DOCUMENTS

| | | |
|---|---|---|
| JP | 2010079296 | 4/2010 |
| JP | 2010224521 | 10/2010 |

(Continued)

*Primary Examiner* — Jordan Schwartz
(74) *Attorney, Agent, or Firm* — Locke Lord LLP; Tim Tingkang Xia, Esq.

(57) ABSTRACT

An imaging lens system includes, in order from an object side to an image side, a first lens element, a second lens element, a third lens element, a fourth lens element, and a fifth lens element. The first lens element with positive refractive power has a convex object-side surface. The second lens element with negative refractive power has a convex object-side surface and a concave image-side surface. The third lens element with negative refractive power has a concave image-side surface and the image-side surface having at least one inflection point in an off-axis region. The fourth lens element with positive refractive power has a concave object-side surface and a convex image-side surface. The fifth lens element with negative refractive power has a concave object-side surface and a concave image-side surface with at least one convex shape in an off-axis region.

37 Claims, 24 Drawing Sheets

(56) References Cited

U.S. PATENT DOCUMENTS

2014/0063619 A1    3/2014  Lai
2014/0293443 A1*  10/2014  Kondo ............... G02B 13/0045
                                                     359/714
2014/0293454 A1   10/2014  Kondo et al.
2015/0277084 A1   10/2015  Hashimoto

FOREIGN PATENT DOCUMENTS

| | | |
|---|---|---|
| JP | 2011227362 | 11/2011 |
| JP | 2011232772 | 11/2011 |
| JP | 2012177852 | 9/2012 |
| JP | 2013156389 | 8/2013 |
| JP | 2013156457 | 8/2013 |
| JP | 2014123092 | 7/2014 |
| JP | 2014123097 | 7/2014 |
| JP | 2015-084066 | 4/2015 |
| KR | 1020090047745 | 5/2009 |
| KR | 1020090067782 | 6/2009 |
| KR | 1020090100814 | 9/2009 |
| TW | 201219884 | 5/2012 |
| TW | 201222061 | 6/2012 |
| TW | 201234068 | 8/2012 |
| TW | 201235730 | 9/2012 |
| TW | 201245800 | 11/2012 |
| TW | 201248187 | 12/2012 |
| TW | 201248241 | 12/2012 |
| TW | 201303348 | 1/2013 |
| TW | 201303411 | 1/2013 |
| TW | 201305591 | 2/2013 |
| TW | 201307883 | 2/2013 |
| TW | 201310058 | 3/2013 |
| TW | 201317609 | 5/2013 |
| TW | 201326956 | 7/2013 |
| TW | 201331622 | 8/2013 |
| TW | I416163 | 11/2013 |
| TW | I431315 | 3/2014 |
| TW | I437312 | 5/2014 |
| WO | 2011118554 A1 | 9/2011 |
| WO | 2012176379 A1 | 12/2012 |
| WO | 2014034027 A1 | 3/2014 |

* cited by examiner

IMAGING LENS SYSTEM, IMAGE CAPTURING DEVICE AND ELECTRONIC DEVICE

RELATED APPLICATIONS

This application claims priority to Taiwan Application Serial Number 103136110, filed Oct. 20, 2014, which is incorporated by reference herein in its entirety.

BACKGROUND

1. Technical Field

The present disclosure relates to an imaging lens system and an image capturing device, and more particularly, to an imaging lens system and an image capturing device applicable to electronic devices.

2. Description of Related Art

As personal electronic products have been becoming more and more compact, the internal components of the electronic products are also required to be smaller in size than before, resulting in an increasing demand for compact imaging lens assemblies. In addition to the demand of miniaturization, the reduction of the pixel size of sensors in the advanced semiconductor manufacturing technologies has enabled imaging lens assemblies to evolve toward the field of higher megapixels. Therefore, the demand for imaging lens assemblies featuring better image quality is rising.

A conventional compact imaging lens assembly equipped in a portable electronic product generally includes four lens elements. However, as high-end mobile devices, such as smartphones and tablet PCs, are gaining popularity, the demand for higher image quality of imaging lens assemblies increases significantly. A conventional imaging lens assembly of four lens elements became insufficient for high-end imaging modules.

A five-element imaging lens system has also been proposed as an attempt to further improve the image quality. However, the refractive power among the lens elements in the conventional five-element imaging lens system is usually poorly distributed and unable to effectively correct the chromatic aberration and the field curvature of the imaging lens system, thus the requirement for high-end image quality cannot be satisfied.

Therefore, a need exists in the art for an imaging lens assembly that features a compact size and a high correcting capability against the chromatic aberration and the field curvature.

SUMMARY

According to one aspect of the present disclosure, an imaging lens system includes, in order from an object side to an image side: a first lens element with positive refractive power having a convex object-side surface; a second lens element with negative refractive power having a convex object-side surface and a concave image-side surface; a third lens element with negative refractive power having a concave image-side surface, an object-side surface and the image-side surface thereof being aspheric, the image-side surface having at least one inflection point in an off-axis region thereof; a fourth lens element with positive refractive power having a concave object-side surface and a convex image-side surface, the object-side surface and the image-side surface thereof being aspheric; and a fifth lens element with negative refractive power having a concave object-side surface and a concave image-side surface, the object-side surface and the image-side surface thereof being aspheric, the image-side surface having at least one convex shape in an off-axis region thereof; wherein the imaging lens system has a total of five lens elements with refractive power and an air gap is arranged between every two adjacent lens elements with refractive power; wherein an Abbe number of the second lens element is V2, an Abbe number of the third lens element is V3, a curvature radius of the object-side surface of the second lens element is R3, a focal length of the imaging lens system is f, an axial distance between the third lens element and the fourth lens element is T34, an axial distance between the fourth lens element and the fifth lens element is T45, a central thickness of the fourth lens element is CT4, and the following conditions are satisfied:

$|V2-V3|<10;$ $|R3|/f<4.0;$ and $0.85<(T34+T45)/CT4.$

According to another aspect of the present disclosure, an image capturing device includes the aforementioned imaging lens system and an image sensor.

According to yet another aspect of the present disclosure, an electronic device includes the aforementioned image capturing device.

When |V2−V3| satisfies the above condition, the capability of correcting the chromatic aberration in the imaging lens system is enhanced.

When |R3|/f satisfies the above condition, low order aberrations can be favorably corrected.

When (T34+T45)/CT4 satisfies the above condition, the configuration of the fourth lens element is more appropriate, and it is favorable for assembling the imaging lens system and keeping the imaging lens system compact.

Both of the second lens element and the third lens element are configured to have negative refractive power so as to reduce the Petzval's sum and to effectively correct the field curvature of the imaging lens system, which are particularly important for a compact imaging lens system with high imaging resolution. Moreover, the satisfaction of the condition of |V2−V3|<10 enhances the capability of correcting the chromatic aberration in the imaging lens system so as to meet the requirement of chromatic aberration for a compact and high pixel-count sensor (effectively a smaller light-sensing pixel).

DETAILED DESCRIPTION

Figure 1A:
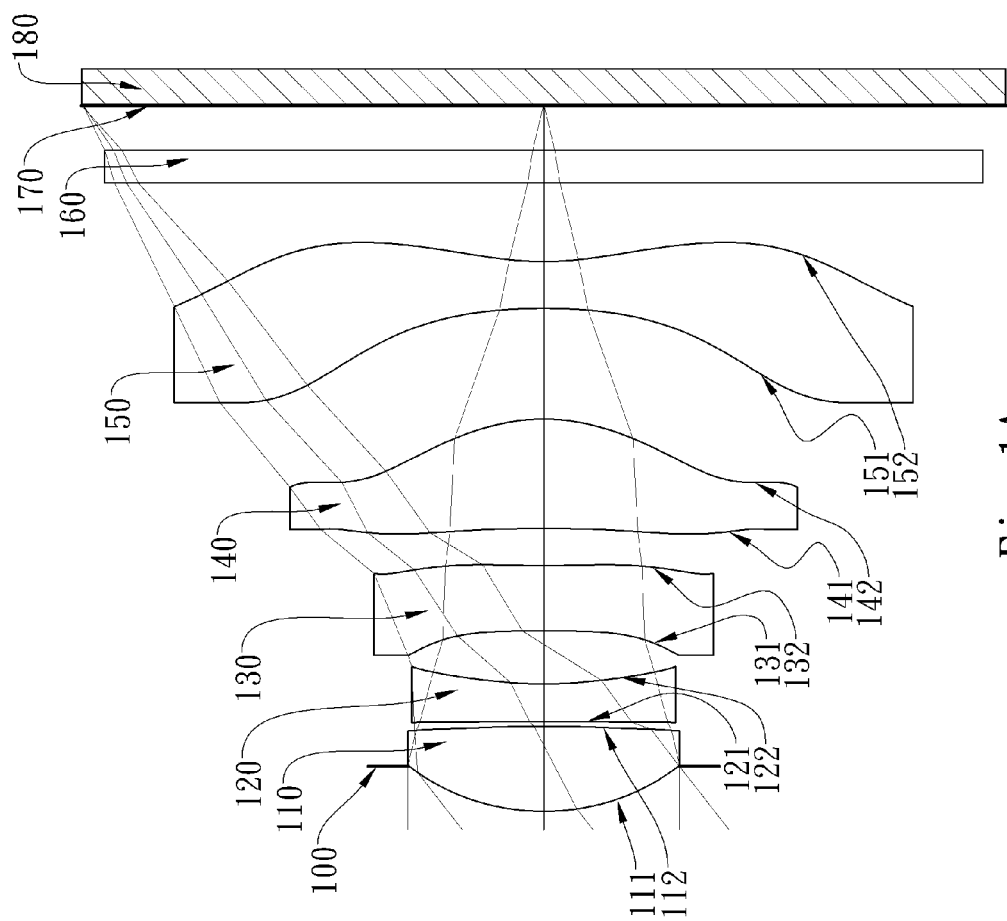
FIG. 1A is a schematic view of an image capturing device according to the 1st embodiment of the present disclosure.

The present disclosure provides an imaging lens system including, in order from an object side to an image side, a first lens element, a second lens element, a third lens element, a fourth lens element, and a fifth lens element, wherein the imaging lens system has a total of five lens elements with refractive power.

In the aforementioned imaging lens system, any two adjacent lens elements of the first lens element, the second lens element, the third lens element, the fourth lens element and the fifth lens element may have an air gap in between. That is, the imaging lens system may have five non-cemented lens elements. Moreover, the manufacturing process of the cemented lens elements is more complex than that of the non-cemented lens elements. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the imaging lens system. Therefore, any two lens elements among the five lens elements of the imaging lens system of the present disclosure have an air gap in between so as to effectively avoid the problem generated by the cemented lens elements.

The first lens element has positive refractive power, so as to reduce the total track length of the imaging lens system. The object-side surface of the first lens element is convex in a paraxial region thereof so as to adjust the distribution of the positive refractive power and thereby to shorten the total track length. The image-side surface of the first lens element may be concave in a paraxial region thereof to effectively correct the low order aberrations.

The second lens element has negative refractive power, so that it is favorable for correcting the aberration created by the first lens element. The object-side surface of the second lens element is convex in a paraxial region thereof so as to adjust the distribution of the positive refractive power and thereby to shorten of the total track length. The image-side surface of the second lens element is concave in a paraxial region thereof so as to correct the astigmatism of the imaging lens system. Moreover, the object-side surface of the second lens element may have at least one concave shape in an off-axis region thereof so as to correct of the off-axis aberration.

The third lens element has negative refractive power, so that it is favorable for correcting the aberration created by the second lens element. The image-side surface of the third lens element is concave in a paraxial region thereof and has at least one inflection point in an off-axis region thereof so as to correct the off-axis aberration. The third lens element may have at least three inflection points between a paraxial region and an off-axial region so that the astigmatism can be favorably corrected to improve the image quality. Moreover, the peripheral region of the third lens element may have negative refractive power so as to effectively correct the field curvature.

The fourth lens element has positive refractive power, so that it provides the imaging lens system with the positive refractive power as it needs to be so as to favorably reduce the total track length of the imaging lens system. The object-side surface of the fourth lens element is concave in a paraxial region thereof, and the image-side surface of the fourth lens element is convex in a paraxial region thereof so as to correct of the aberration. The image-side surface of the fourth lens element may have at least one critical point, so that the incident angle of the light projecting onto an image sensor from the off-axis field can be effectively suppressed to increase the receiving efficiency of the image sensor. The critical point described herein refers to a tangential point where the tangential plane, which is perpendicular to the optical axis, is tangent to the lens surface exclusive of the intersection of the lens surface and the optical axis.

The fifth lens element has negative refractive power so that the back focal length of the imaging lens system can be favorably reduced to keep the imaging lens system compact. The object-side surface of the fifth lens element is concave in a paraxial region, and the image-side surface of the fifth lens element is concave in a paraxial region thereof so as to correct the astigmatism of the imaging lens system. When the image-side surface of the fifth lens element has at least one convex shape in an off-axis region and the peripheral region of the fifth lens element has positive refractive power to effectively suppress the incident angle of the light projecting onto an image sensor from the off-axis field and thereby to increase the receiving efficiency of the image sensor, the aberration of the off-axis field can be further corrected.

When an Abbe number of the second lens element is V2, an Abbe number of the third lens element is V3, and the following condition is satisfied: |V2−V3|<10, the capability of correcting the chromatic aberration in the imaging lens system can be enhanced and thereby to satisfy the requirement for a small-sized and high pixel-count sensor (a smaller light-sensing pixel).

When a curvature radius of the object-side surface of the second lens element is R3, a focal length of the imaging lens system is f, and the following condition is satisfied: |R3|/f<4.0, the aberration can be favorably corrected. Preferably, the following condition is satisfied: |R3|/f<3.0.

When an axial distance between the third lens element and the fourth lens element is T34, an axial distance between the fourth lens element and the fifth lens element is T45, a central thickness of the fourth lens element is CT4, and the following condition is satisfied: 0.85<(T34+T45)/CT4, the configuration of the fourth lens element is more appropriate, and this is favorable for assembling the imaging lens system and keeping the imaging lens system compact. Preferably, the following condition is satisfied: 1.15<(T34+T45)/CT4<2.0.

When a focal length of the first lens element is f1, a focal length of the fourth lens element is f4, and the following condition is satisfied: |(f1−f4)/(f1+f4)|<0.15, the distribution of the refractive power of the imaging lens system is more balanced and thereby to reduce the sensitivity of the imaging lens system.

When the focal length of the imaging lens system is f, a curvature radius of the object-side surface of the third lens element is R5, a curvature radius of the image-side surface of the third lens element is R6, a curvature radius of the object-side surface of the fourth lens element is R7, and the following condition is satisfied: f/|R5|+f/|R6|+f/|R7|<1.50, the curvature configuration of the third lens element can be controlled and thereby improve the image quality.

When a focal length of the third lens element is f3, an axial distance between the first lens element and the second lens element is T12, and the following condition is satisfied: f3/T12<−1000, the configuration of the second lens element and the third lens element can effectively correct the aberration of the imaging lens system.

When the imaging lens system further includes a stop, an axial distance between the stop and the image-side surface of the fifth lens element is Sd, an axial distance between the object-side surface of the first lens element and the image-side surface of the fifth lens element is Td, the focal length of the imaging lens system is f, and the following conditions are satisfied: 0.87<Sd/Td<0.98 and 2.8 [mm]<f<4.2 [mm], it is favorable to obtain a balance between telecentricity and wide field of view.

When the focal length of the imaging lens system is f, the focal length of the third lens element is f3, and the following condition is satisfied: f3/f<−10, it is favorable for reducing the sensitivity of the imaging lens system and the generation of the spherical aberration.

When a total axial distance of the air gaps between every two adjacent lens elements with refractive power is ΣAT [the sum of the axial distance between the first lens element and the second lens element (T12), the axial distance between the second lens element and the third lens element (T23), the axial distance between the third lens element and the fourth lens element (T34), the axial distance between the fourth lens element and the fifth lens element (T45), i.e. ΣAT=T12+T23+T34+T45], an equivalent air distance between the image-side surface of the fifth lens element and an image surface is BFL, and the following condition is satisfied: 1.1<ΣAT/BFL<1.75, the overall spatial arrangement of the imaging lens system can be controlled to keep the imaging lens system compact.

When a distance in parallel with an optical axis from an axial vertex on the object-side surface of the fourth lens element to a maximum effective diameter position on the object-side surface of the fourth lens element is SAG41, the central thickness of the fourth lens element is CT4, and the following condition is satisfied: |SAG41|/CT4<0.25, the shape and thickness of the fourth lens element is appropriate and favorable for lens manufacturing.

When a distance in parallel with an optical axis from an axial vertex on the object-side surface of the fifth lens element to a maximum effective diameter position on the object-side surface of the fifth lens element is SAG51, the axial distance between the fourth lens element and the fifth lens element is T45, and the following condition is satisfied: 0.80<|SAG51|/T45<1.10, the shape of the fifth lens element is appropriate and favorable for arranging the lens elements in the imaging lens system.

When a central thickness of the second lens element is CT2, a central thickness of the third lens element is CT3, the central thickness of the fourth lens element is CT4, and the following condition is satisfied: 0.70<(CT2+CT3)/CT4<1.00, the manufacturing yield rate can be favorably increased.

Figure 11:
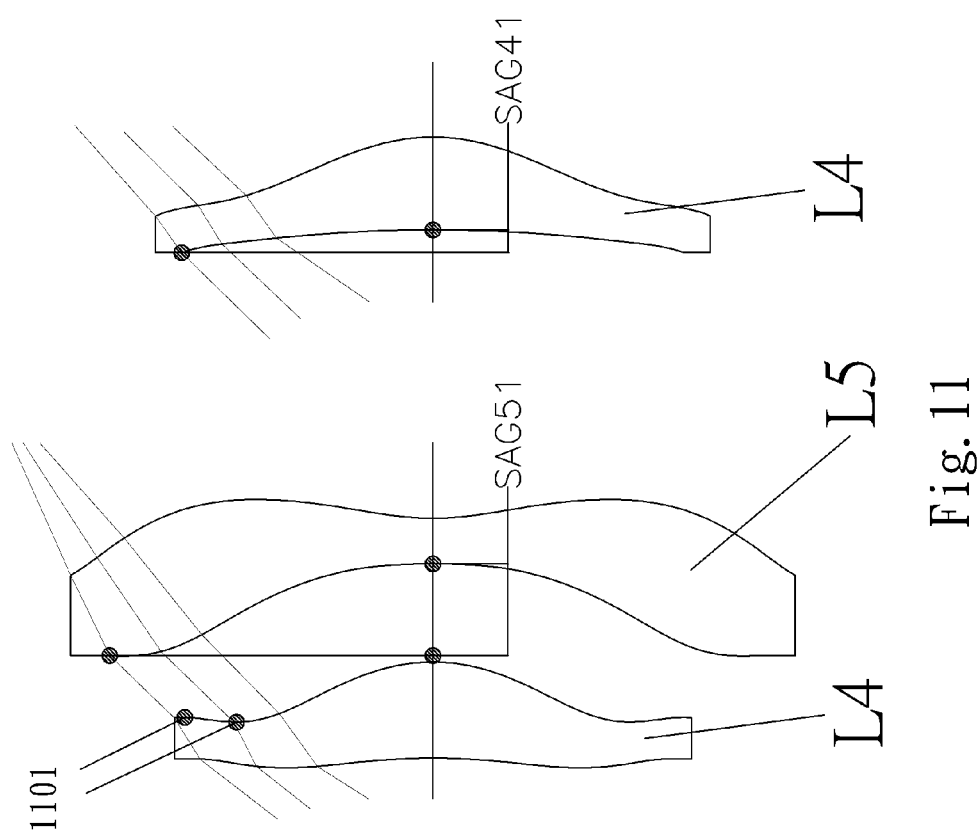
FIG. 11 shows the distance in parallel with an optical axis from an axial vertex on the object-side surface of each of the fourth lens element and the fifth lens element to a maximum effective diameter position on the object-side surface of each of the fourth lens element and the fifth lens element and the critical point position of the image-side surface of the fourth lens element.

FIG. 11 shows the distances represented by SAG41 and SAG51, respectively. In FIG. 11, the distance in parallel with an optical axis from an axial vertex on the object-side surface of the fourth lens element (L4) to a maximum effective diameter position on the object-side surface of the fourth lens element is SAG41; the distance in parallel with an optical axis from an axial vertex on the object-side surface of the fifth lens element (L5) to a maximum effective diameter position on the object-side surface of the fifth lens element is SAG51; the critical point (1101) on the lens surface is a tangential point where the tangential plane, which is perpendicular to the optical axis, is tangent to the lens surface. It is to be noted that the critical point (1101) is an extremum and not located on the optical axis.

According to the imaging lens system of the present disclosure, the lens elements thereof can be made of glass or plastic material. When the lens elements are made of glass material, the distribution of the refractive power of the imaging lens system may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surfaces so as to have more controllable variables for eliminating the aberration thereof, and to further decrease the required number of the lens elements. Therefore, the total track length of the imaging lens system can be reduced.

According to the imaging lens system of the present disclosure, the imaging lens system can include at least one stop, such as an aperture stop, a glare stop or a field stop.

According to the imaging lens system of the present disclosure, a stop can be configured as a front stop or a middle stop. A front stop disposed between an imaged object and the first lens element can provide a longer distance between an exit pupil of the imaging lens system and the image surface and thereby to improve the image-sensing efficiency of an image sensor, such as a CCD or CMOS sensor. A middle stop disposed between the first lens element and the image surface is favorable for enlarging the field of view of the imaging lens system and thereby to provide a wider field of view for the same.

According to the imaging lens system of the present disclosure, when the lens element has a convex surface and the region of convex shape is not defined, it indicates that the surface is convex in the paraxial region thereof; when the lens element has a concave surface and the region of concave shape is not defined, it indicates that the surface is concave in the paraxial region thereof. Likewise, when the region of refractive power or focal length of a lens element is not defined, it indicates that the region of refractive power or focal length of the lens element is in the paraxial region thereof.

According to the imaging lens system of the present disclosure, an image surface of the imaging lens system, based on the corresponding image sensor, can be a plane or a curved surface with any curvature, especially a curved surface being concave facing towards the object side.

The imaging lens system of the present disclosure can be optionally applied to moving focus optical systems. According to the imaging lens system of the present disclosure, the imaging lens system features good correction capability and high image quality, and can be applied to 3D (three-dimensional) image capturing applications and electronic devices, such as digital cameras, mobile devices, digital tablets, smart TV, wireless monitoring device, motion sensing input device, driving recording system, rear view camera system, and wearable devices.

According to the present disclosure, an image capturing device includes the aforementioned imaging lens system and an image sensor, wherein the image sensor is disposed on or near an image surface of the imaging lens system. Therefore, the design of the imaging lens system enables the image capturing device to achieve the best image quality. Preferably, the image capturing device can further include a barrel member, a holding member or a combination thereof.

Figure 12A:
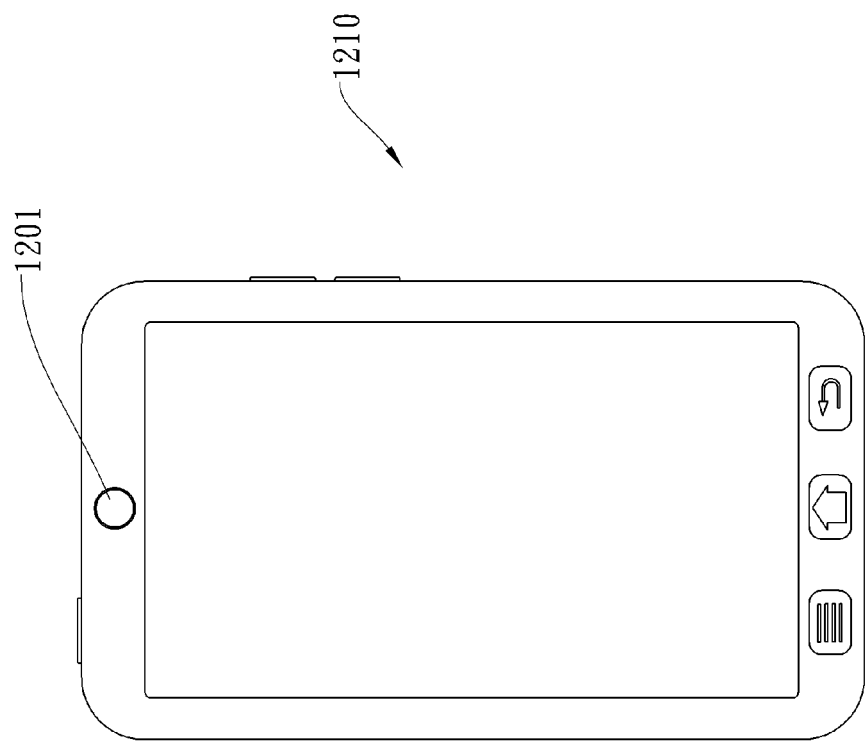
FIG. 12A shows a smart phone with an image capturing device of the present disclosure installed therein.
Figure 12B:
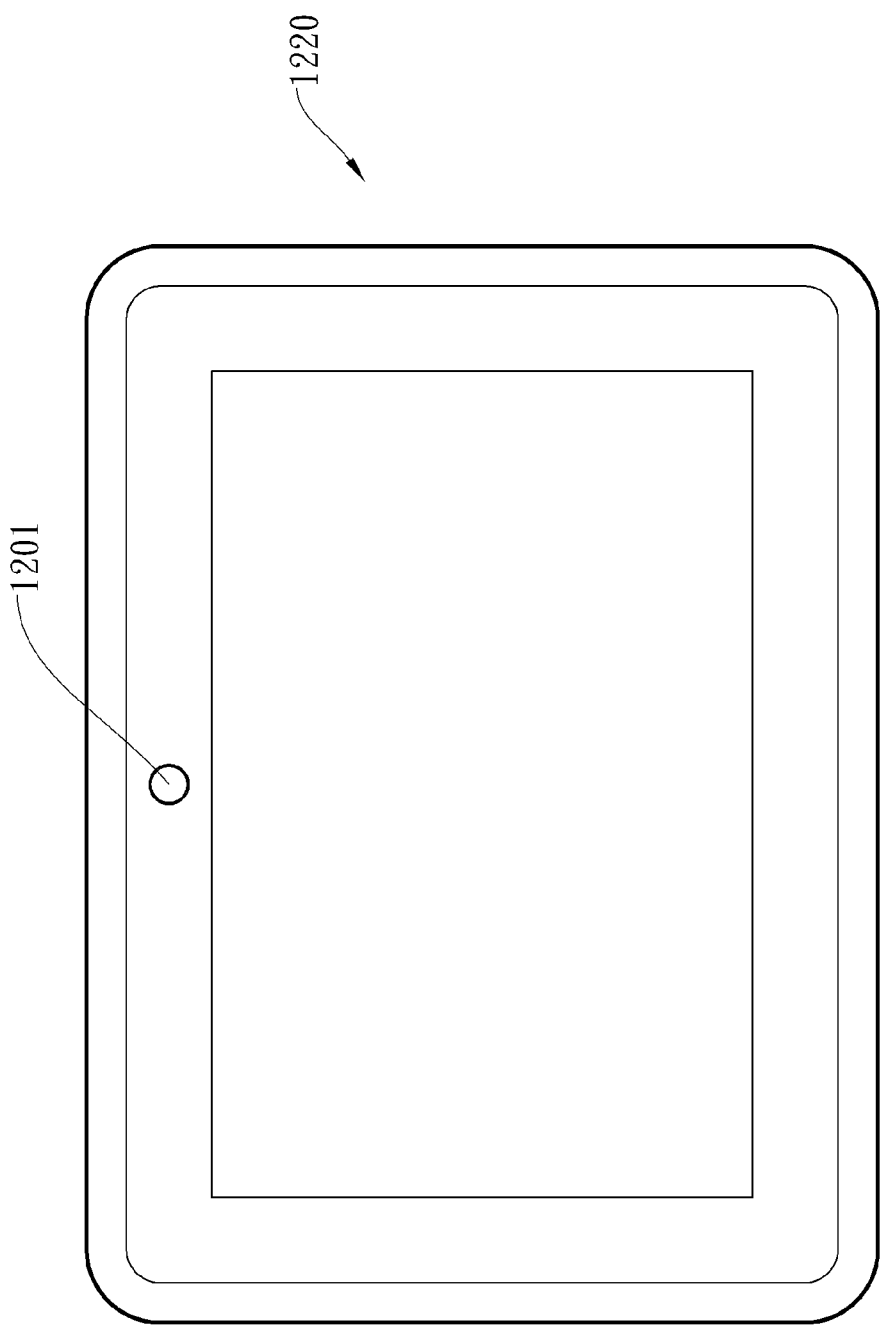
FIG. 12B shows a tablet personal computer with an image capturing device of the present disclosure installed therein.
Figure 12C:
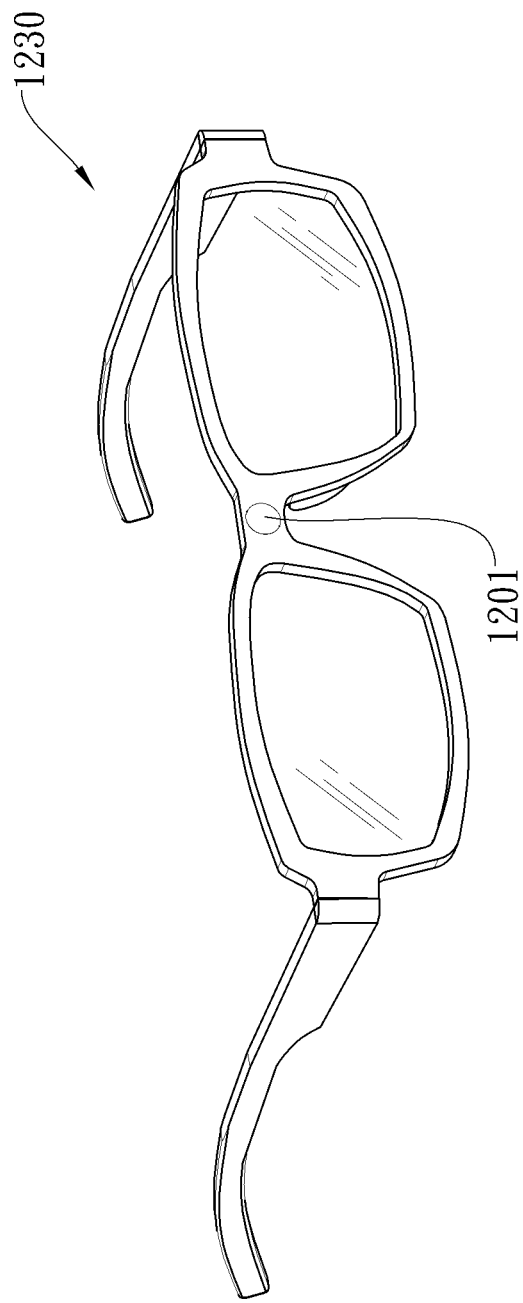
FIG. 12C shows a wearable device with an image capturing device of the present disclosure installed therein.

Referring to FIG. 12A, FIG. 12B and FIG. 12C, an image capturing device 1201 may be installed in but not limited to an electronic device, including a smart phone 1210, a tablet personal computer 1220 or a wearable device 1230. The three exemplary figures of different kinds of electronic devices are only exemplary for showing the image capturing device of present disclosure installed in an electronic device and are not limited thereto. Preferably, the electronic device can further include a control unit, a display unit, a storage unit, a random access memory unit (RAM) or a combination thereof.

According to the above description of the present disclosure, the following 1st-10th specific embodiments are provided for further explanation.

1st Embodiment

Figure 1B:
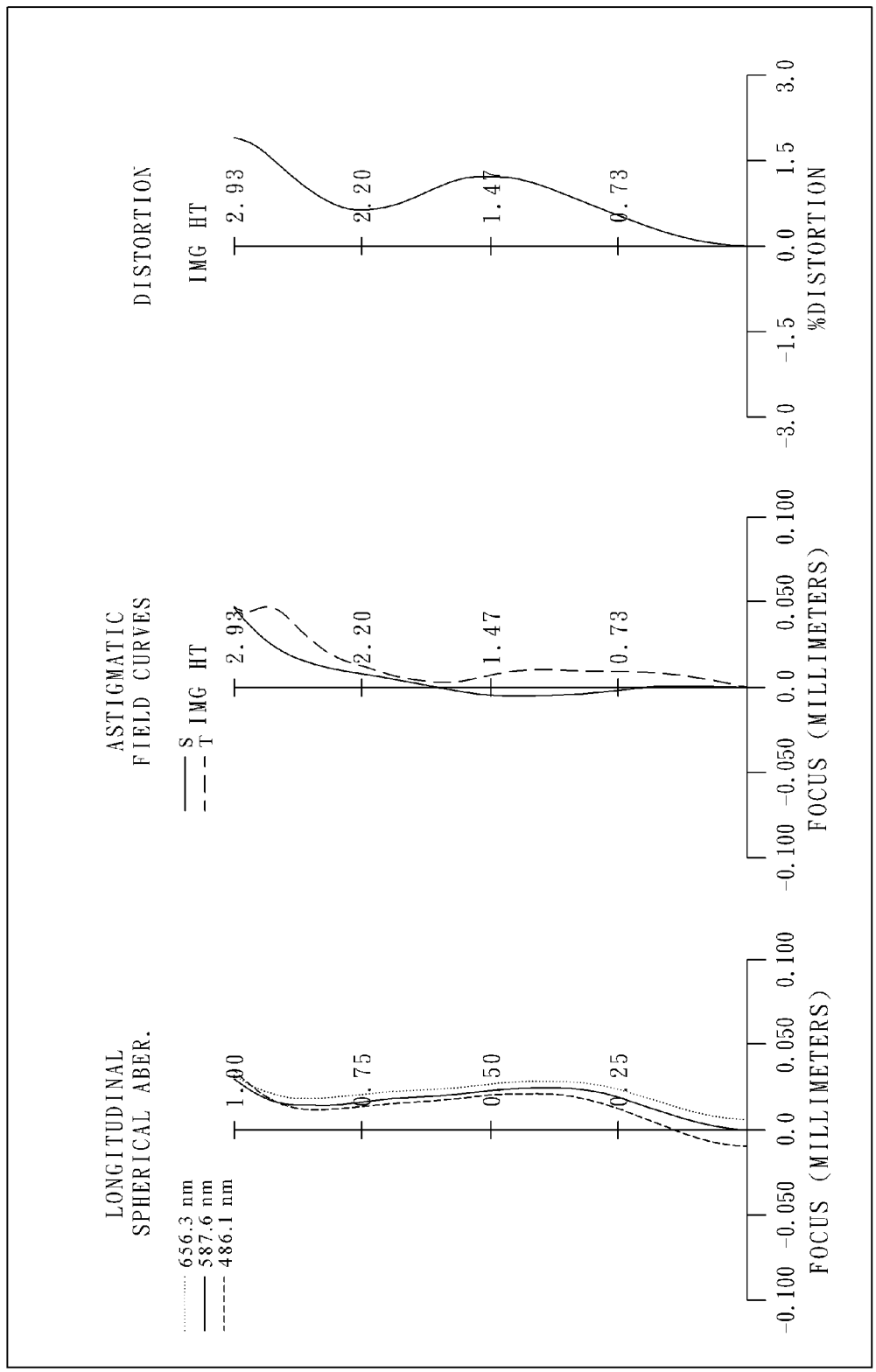
FIG. 1B shows spherical aberration curves, astigmatic field curves and a distortion curve of the image capturing device according to the 1st embodiment.

FIG. 1A is a schematic view of an image capturing device according to the 1st embodiment of the present disclosure. FIG. 1B shows, in order from left to right, spherical aberration curves, astigmatic field curves and a distortion curve of the image capturing device according to the 1st embodiment.

In FIG. 1A, the image capturing device includes an imaging lens system (not otherwise herein labeled) of the present disclosure and an image sensor 180. The imaging lens system includes, in order from an object side to an image side, a first lens element 110, a second lens element 120, a third lens element 130, a fourth lens element 140, and a fifth lens element 150, wherein the imaging lens system has a total of five lens elements (110-150) with refractive power and an air gap is arranged between every two adjacent lens elements with refractive power.

The first lens element 110 with positive refractive power has an object-side surface 111 being convex in a paraxial region thereof and an image-side surface 112 being convex in a paraxial region thereof, which are both aspheric, and the first lens element 110 is made of plastic material.

The second lens element 120 with negative refractive power has an object-side surface 121 being convex in a paraxial region thereof and an image-side surface 122 being concave in a paraxial region thereof, which are both aspheric, and the second lens element 120 is made of plastic material. Furthermore, the object-side surface 121 of the second lens element 120 has at least one concave shape in an off-axis region thereof.

The third lens element 130 with negative refractive power has an object-side surface 131 being concave in a paraxial region thereof and an image-side surface 132 being concave in a paraxial region thereof, which are both aspheric, and the third lens element 130 is made of plastic material. Furthermore, the image-side surface 132 of the third lens element 130 has at least one inflection point in an off-axis region thereof.

The fourth lens element 140 with positive refractive power has an object-side surface 141 being concave in a paraxial region thereof and an image-side surface 142 being convex in a paraxial region thereof, which are both aspheric, and the fourth lens element 140 is made of plastic material. Furthermore, the image-side surface 142 of the fourth lens element 140 has at least one critical point.

The fifth lens element 150 with negative refractive power has an object-side surface 151 being concave in a paraxial region thereof and an image-side surface 152 being concave in a paraxial region thereof, which are both aspheric, and the fifth lens element 150 is made of plastic material. Furthermore, the image-side surface 152 of the fifth lens element 150 has at least one convex shape in an off-axis region thereof.

The imaging lens system further includes a stop 100 disposed between an imaged object and the first lens element 110 and an IR-cut filter 160. The IR-cut filter 160 is made of glass and located between the fifth lens element 150 and an image surface 170, and will not affect the focal length of the imaging lens system.

The image sensor 180 is disposed on or near the image surface 170 of the imaging lens system.

The equation of the aspheric surface profiles is expressed as follows:

$$X(Y) = (Y^2/R)/(1 + sqrt(1 - (1+k)*(Y/R)^2)) + \sum_i (Ai)*(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the first embodiment, a focal length of the imaging lens system is f, an f-number of the imaging lens system is Fno, half of a maximal field of view of the imaging lens system is HFOV, and these parameters have the following values: $f=3.67$ mm; Fno=2.12; and HFOV=37.9 degrees.

In the first embodiment, an Abbe number of the second lens element is V2, an Abbe number of the third lens element is V3, and they satisfy the condition: $|V2-V3|=8.8$.

In the first embodiment, a central thickness of the second lens element 120 is CT2, a central thickness of the third lens element 130 is CT3, a central thickness of the fourth lens element 140 is CT4, and they satisfy the condition: $(CT2+CT3)/CT4=0.94$.

In the first embodiment, an axial distance between the third lens element 130 and the fourth lens element 140 is T34, an axial distance between the fourth lens element 140 and the fifth lens element 150 is T45, the central thickness of the fourth lens element 140 is CT4, and they satisfy the condition: $(T34+T45)/CT4=1.35$.

In the first embodiment, a total axial distance of the air gaps between every two adjacent lens elements with refractive power is ΣAT (i.e. $\Sigma AT=T12+T23+T34+T45$), an equivalent air distance between the image-side surface 152 of the fifth lens element 150 and the image surface is BFL, and they satisfy the condition: $\Sigma AT/BFL=1.42$.

In the first embodiment, an axial distance between the stop and the image-side surface 152 of the fifth lens element 150 is Sd, an axial distance between the object-side surface 111 of the first lens element 110 and the image-side surface 152 of the fifth lens element 150 is Td, and they satisfy the condition: $Sd/Td=0.92$.

In the first embodiment, a distance in parallel with an optical axis from an axial vertex on the object-side surface 141 of the fourth lens element 140 to a maximum effective diameter position on the object-side surface 141 of the fourth lens element 140 is SAG41 (SAG41 is defined as a negative value if the aforementioned distance is measured in a direction towards the object side, and SAG41 is defined as a positive value if the aforementioned distance is measured in a direction towards the image side), the central thickness of the fourth lens element 140 is CT4, and they satisfy the condition: $|SAG41|/CT4=0.01$.

In the first embodiment, a distance in parallel with an optical axis from an axial vertex on the object-side surface 151 of the fourth lens element 150 to a maximum effective diameter position on the object-side surface 151 of the fourth lens element 150 is SAG51 (SAG51 is defined as a negative value if the aforementioned distance is measured in a direction towards the object side, and SAG51 is defined as a positive value if the aforementioned distance is measured in a direction towards the image side), the axial distance between the fourth lens element 140 and the fifth lens element 150 is T45, and they satisfy the condition: $|SAG51|/T45=0.85$.

In the first embodiment, the focal length of the imaging lens system is f, a curvature radius of the object-side surface 121 of the second lens element 120 is R3, and they satisfy the condition: $|R3|/f=3.57$.

In the first embodiment, a focal length of the first lens element 110 is f1, a focal length of the fourth lens element 140 is f4, and they satisfy the condition: $|(f1-f4)/(f1+f4)|=0.02$.

In the first embodiment, a focal length of the third lens element 130 is f3, the focal length of the imaging lens system is f, and they satisfy the condition: $f3/f=-2.95$.

In the first embodiment, the focal length of the third lens element 130 is f3, the axial distance between the first lens element 110 and the second lens element 120 is T12, and they satisfy the condition: $f3/T12=-360.33$.

In the first embodiment, the focal length of the imaging lens system is f, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and they satisfy the condition: $f/|R5|+f/|R6|+f/|R7|=0.87$.

In the first embodiment, the third lens element 130 has three inflection points.

The detailed optical data of the first embodiment are shown in TABLE 1, and the aspheric surface data are shown in TABLE 2, wherein the units of the curvature radius, the thickness and the focal length are expressed in mm, Fno is the f-number of the imaging lens system and HFOV is half of the maximal field of view.

TABLE 1

(Embodiment 1)
f = 3.67 mm, Fno = 2.12, HFOV = 37.9 deg.

| Surface# | | Curvature Radius | | Thickness | Material | Index | Abbe# | Focal Length |
|---|---|---|---|---|---|---|---|---|
| 0 | Object | Plano | | Infinity | | | | |
| 1 | Stop | Plano | | −0.286 | | | | |
| 2 | Lens 1 | 1.452 | ASP | 0.542 | Plastic | 1.514 | 56.8 | 2.65 |
| 3 | | −19.008 | ASP | 0.030 | | | | |
| 4 | Lens 2 | 13.116 | ASP | 0.240 | Plastic | 1.583 | 30.2 | −5.00 |
| 5 | | 2.372 | ASP | 0.338 | | | | |
| 6 | Lens 3 | −68.382 | ASP | 0.418 | Plastic | 1.650 | 21.4 | −10.81 |
| 7 | | 7.847 | ASP | 0.236 | | | | |
| 8 | Lens 4 | −10.577 | ASP | 0.698 | Plastic | 1.544 | 55.9 | 2.53 |
| 9 | | −1.246 | ASP | 0.706 | | | | |
| 10 | Lens 5 | −4.059 | ASP | 0.300 | Plastic | 1.514 | 56.8 | −2.52 |
| 11 | | 1.952 | ASP | 0.500 | | | | |
| 12 | IR-cut filter | Plano | | 0.210 | Glass | 1.517 | 64.2 | — |
| 13 | | Plano | | 0.283 | | | | |
| 14 | Image Surface | Plano | | — | | | | |

Note:
Reference Wavelength is d-line 587.6 nm
Note:
Effective radius of the fifth surface is 0.840 mm

TABLE 2

Aspheric Coefficients

| Surface # | 2 | 3 | 4 | 5 | 6 |
|---|---|---|---|---|---|
| k = | −4.8281E+00 | −8.9844E+01 | −9.9000E+01 | −1.8029E+01 | −9.9000E+01 |
| A4 = | 1.9300E−01 | −4.5248E−01 | −6.5654E−01 | −2.0534E−01 | −3.6157E−01 |
| A6 = | −4.4905E−02 | 2.7748E+00 | 3.4924E+00 | 1.0927E+00 | 2.5535E−01 |
| A8 = | −3.1210E−02 | −8.3131E+00 | −1.0186E+01 | −3.3284E+00 | −5.8837E−01 |
| A10 = | −1.7873E−02 | 1.4551E+01 | 1.7924E+01 | 6.4890E+00 | 9.8206E−01 |
| A12 = | 2.7829E−01 | −1.3904E+01 | −1.7428E+01 | −7.0534E+00 | −8.9396E−01 |
| A14 = | −2.6761E−01 | 5.3885E+00 | 7.0073E+00 | 3.2678E+00 | 4.2355E−01 |

| Surface # | 7 | 8 | 9 | 10 | 11 |
|---|---|---|---|---|---|
| k = | −3.6174E+01 | 6.4077E+00 | −6.1407E+00 | −1.5001E+01 | −1.3201E+01 |
| A4 = | −2.1912E−01 | −2.1240E−02 | −2.5466E−01 | −1.6887E−01 | −7.2986E−02 |
| A6 = | 1.1225E−01 | −1.6442E−02 | 3.9598E−01 | 1.5074E−01 | 3.4946E−02 |
| A8 = | 1.6930E−02 | 1.3627E−01 | −4.6022E−01 | −1.2447E−01 | −1.8224E−02 |
| A10 = | −7.9707E−02 | −1.2489E−01 | 4.0948E−01 | 6.5017E−02 | 5.7535E−03 |
| A12 = | 7.5468E−02 | 4.8255E−02 | −2.0480E−01 | −1.8076E−02 | −1.0409E−03 |
| A14 = | −1.5363E−02 | −7.5266E−03 | 5.0981E−02 | 2.5185E−03 | 1.0492E−04 |
| A16 = | | | −5.0095E−03 | −1.3990E−04 | −4.6128E−06 |

2nd Embodiment

Figure 2A:
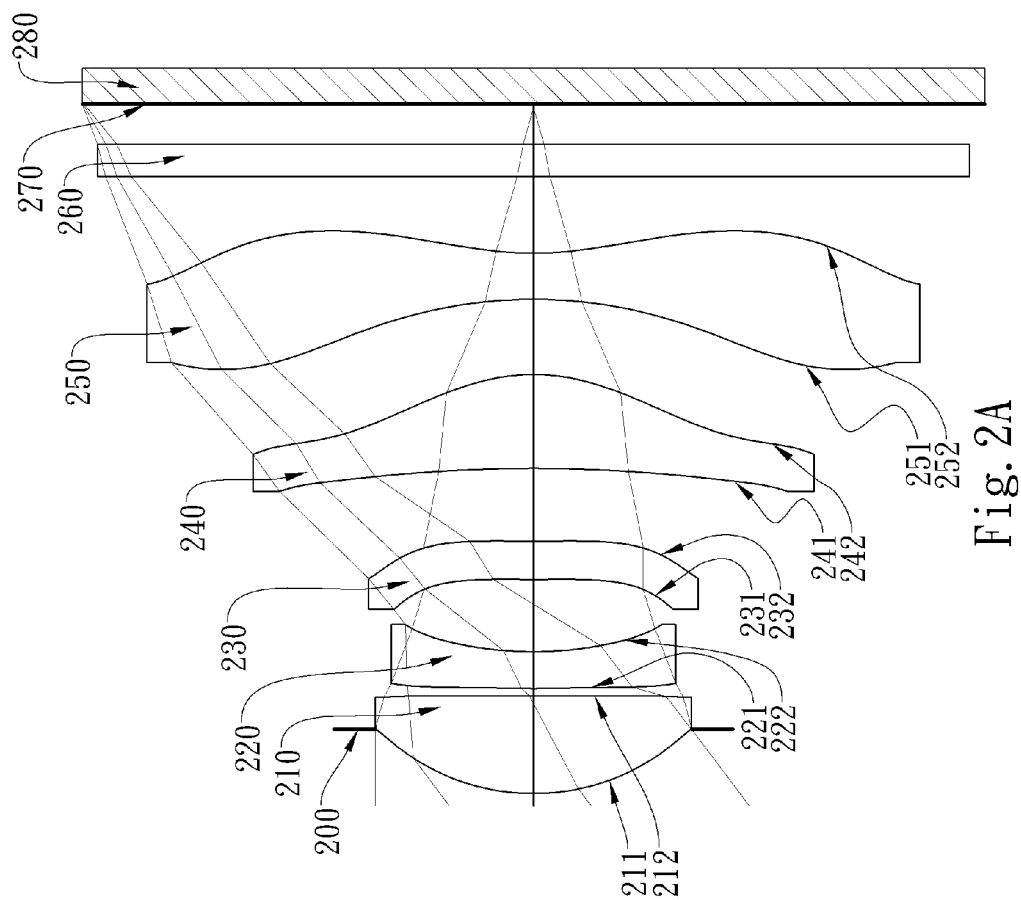
FIG. 2A is a schematic view of an image capturing device according to the 2nd embodiment of the present disclosure.
Figure 2B:
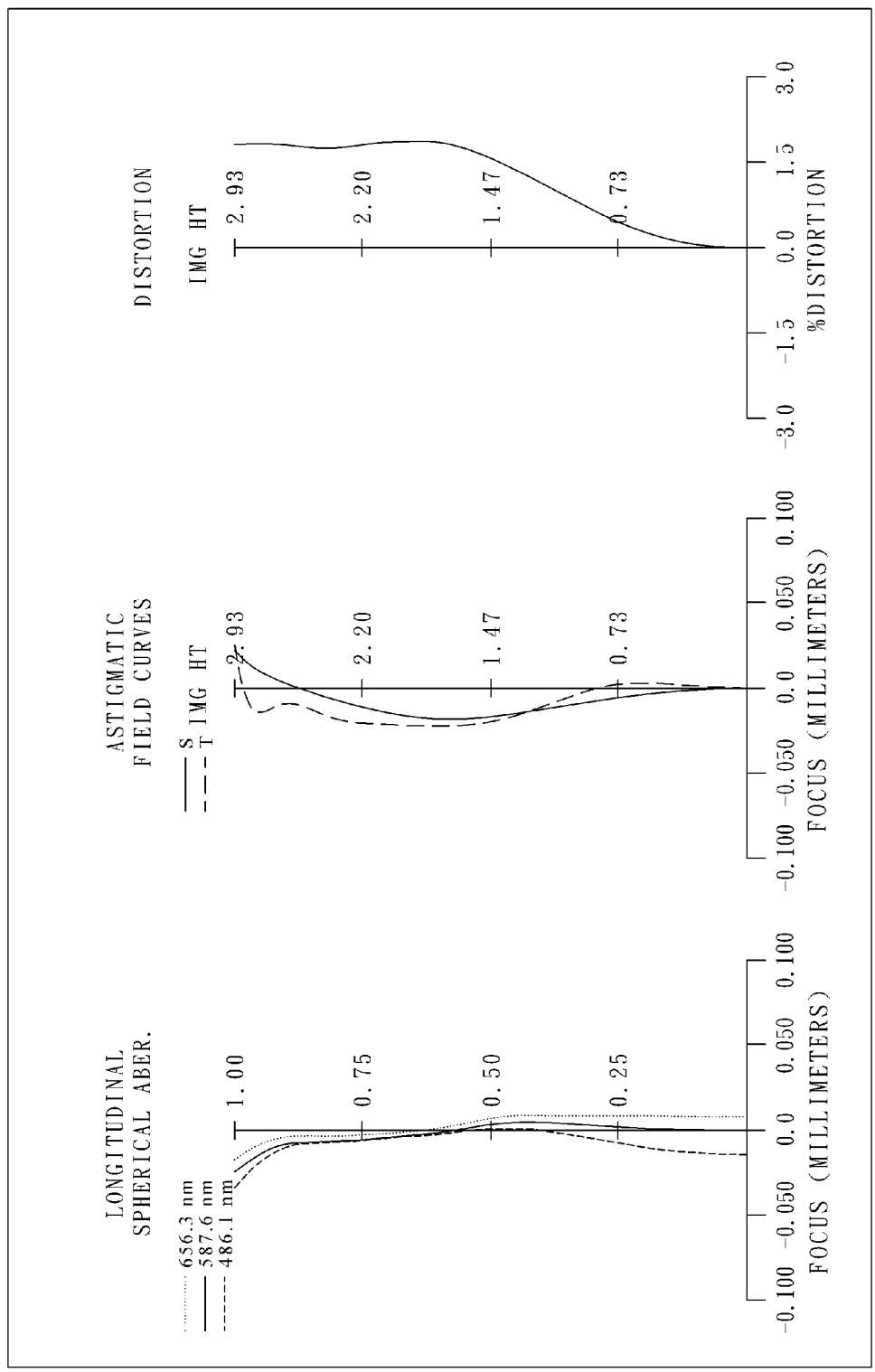
FIG. 2B shows spherical aberration curves, astigmatic field curves and a distortion curve of the image capturing device according to the 2nd embodiment.

FIG. 2A is a schematic view of an image capturing device according to the 2nd embodiment of the present disclosure. FIG. 2B shows, in order from left to right, spherical aberration curves, astigmatic field curves and a distortion curve of the image capturing device according to the 2nd embodiment.

In FIG. 2A, the image capturing device includes an imaging lens system (not otherwise herein labeled) of the present disclosure and an image sensor 280. The imaging lens system includes, in order from an object side to an image side, a first lens element 210, a second lens element 220, a third lens element 230, a fourth lens element 240, and a fifth lens element 250, wherein the imaging lens system has a total of five lens elements with refractive power and an air gap is arranged between every two adjacent lens elements with refractive power.

The first lens element 210 with positive refractive power has an object-side surface 211 being convex in a paraxial region thereof and an image-side surface 212 being concave in a paraxial region thereof, which are both aspheric, and the first lens element 210 is made of plastic material.

The second lens element 220 with negative refractive power has an object-side surface 221 being convex in a paraxial region thereof and an image-side surface 222 being concave in a paraxial region thereof, which are both aspheric, and the second lens element 220 is made of plastic material. Furthermore, the object-side surface 221 of the second lens element 220 has at least one concave shape in an off-axis region thereof.

The third lens element 230 with negative refractive power has an object-side surface 231 being convex in a paraxial region thereof and an image-side surface 232 being concave in a paraxial region thereof, which are both aspheric, and the third lens element 230 is made of plastic material. Furthermore, the image-side surface 232 of the third lens element 230 has at least one inflection point in an off-axis region thereof.

The fourth lens element 240 with positive refractive power has an object-side surface 241 being concave in a paraxial region thereof and an image-side surface 242 being convex in a paraxial region thereof, which are both aspheric, and the fourth lens element 240 is made of plastic material. Furthermore, the image-side surface 242 of the fourth lens element 240 has at least one critical point.

The fifth lens element 250 with negative refractive power has an object-side surface 251 being concave in a paraxial region thereof and an image-side surface 252 being concave in a paraxial region thereof, which are both aspheric, and the fifth lens element 250 is made of plastic material. Furthermore, the image-side surface 252 of the fifth lens element 250 has at least one convex shape in an off-axis region thereof.

The imaging lens system further includes a stop 200 disposed between an imaged object and the first lens element 210 and an IR-cut filter 260. The IR-cut filter 260 is made of glass and located between the fifth lens element 250 and an image surface 270, and will not affect the focal length of the imaging lens system.

The image sensor 280 is disposed on or near the image surface 270 of the imaging lens system.

The detailed optical data of the second embodiment are shown in TABLE 3, and the aspheric surface data are shown in TABLE 4, wherein the units of the curvature radius, the thickness and the focal length are expressed in mm, and HFOV is half of the maximal field of view.

TABLE 3

(Embodiment 2)
f = 3.83 mm, Fno = 1.86, HFOV = 37.0 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.419 | | | | |
| 2 | Lens 1 | 1.449 | ASP | 0.634 | Plastic | 1.544 | 55.9 | 2.96 |
| 3 | | 12.204 | ASP | 0.050 | | | | |

TABLE 3-continued (Embodiment 2)
f = 3.83 mm, Fno = 1.86, HFOV = 37.0 deg.

| Surface# | | Curvature Radius | | Thickness | Material | Index | Abbe # | Focal Length |
|---|---|---|---|---|---|---|---|---|
| 4 | Lens 2 | 6.255 | ASP | 0.240 | Plastic | 1.639 | 23.5 | −5.32 |
| 5 | | 2.169 | ASP | 0.471 | | | | |
| 6 | Lens 3 | 21.444 | ASP | 0.250 | Plastic | 1.639 | 23.5 | −185.72 |
| 7 | | 18.079 | ASP | 0.475 | | | | |
| 8 | Lens 4 | −9.722 | ASP | 0.612 | Plastic | 1.544 | 55.9 | 2.52 |
| 9 | | −1.227 | ASP | 0.490 | | | | |
| 10 | Lens 5 | −2.989 | ASP | 0.300 | Plastic | 1.544 | 55.9 | −2.20 |
| 11 | | 2.065 | ASP | 0.500 | | | | |
| 12 | IR-cut filter | Plano | | 0.210 | Glass | 1.517 | 64.2 | — |
| 13 | | Plano | | 0.262 | | | | |
| 14 | Image Surface | Plano | | — | | | | |

Note:
Reference wavelength is d-line 587.6 nm
Note:
Effective radius of the fifth surface is 0.835 mm

TABLE 4

Aspheric Coefficients

| Surface# | 2 | 3 | 4 | 5 | 6 |
|---|---|---|---|---|---|
| k = | −5.5257E+00 | −8.9998E+01 | 1.7810E+01 | 3.1367E+00 | −5.3300E+00 |
| A4 = | 2.3413E−01 | −2.7687E−01 | −4.2422E−01 | −2.3118E−01 | −2.7020E−01 |
| A6 = | −2.1382E−01 | 8.5244E−01 | 1.2402E+00 | 6.3288E−01 | −4.5560E−02 |
| A8 = | 3.7134E−01 | −1.4724E+00 | −2.1096E+00 | −1.1647E+00 | 8.9944E−02 |
| A10 = | −5.1392E−01 | 1.5409E+00 | 2.2877E+00 | 1.6026E+00 | −2.8315E−01 |
| A12 = | 4.2616E−01 | −9.1087E−01 | −1.4317E+00 | −1.4016E+00 | 1.9881E−01 |
| A14 = | −1.5337E−01 | 2.1974E−01 | 3.9795E−01 | 6.1333E−01 | |

| Surface# | 7 | 8 | 9 | 10 | 11 |
|---|---|---|---|---|---|
| k = | −8.9997E+01 | −7.4584E+01 | −3.3655E+00 | −7.8988E−01 | −1.2933E+01 |
| A4 = | −2.1332E−01 | −2.9226E−02 | −3.2794E−02 | 9.0244E−03 | −4.5957E−02 |
| A6 = | −3.1299E−02 | 6.5553E−02 | 5.5136E−02 | −1.7787E−02 | 1.0882E−02 |
| A8 = | 6.1223E−02 | −7.8886E−02 | −1.2247E−02 | 1.2624E−02 | −2.3163E−03 |
| A10 = | −1.0256E−01 | 4.8250E−02 | −1.1795E−03 | −3.1000E−03 | 1.9912E−04 |
| A12 = | 5.1882E−02 | −1.4196E−02 | 6.0072E−04 | 3.4201E−04 | 6.3036E−06 |
| A14 = | 1.3617E−02 | 1.5731E−03 | −5.4513E−05 | −1.4412E−05 | −9.9975E−07 |

In the 2nd embodiment, the equation of the aspheric surface profiles of the aforementioned lens elements is the same as the equation of the 1st embodiment. Also, the definitions of these parameters shown in Table 5 below are the same as those stated in the 1st embodiment with corresponding values for the 2nd embodiment, so an explanation in this regard will not be provided again.

Moreover, these parameters can be calculated from Table 3 and Table 4 and satisfy the conditions stated in Table 5.

TABLE 5

2nd Embodiment

| f [mm] | 3.83 | |SAG41|/CT4 | 0.25 |
|---|---|---|---|
| Fno | 1.86 | |SAG51|/T45 | 0.84 |
| HFOV [deg.] | 37.0 | |R3|/f | 1.63 |
| |V2−V3| | 0.0 | |(f1 − f4)/(f1 + f4)| | 0.08 |
| (CT2 + CT3)/CT4 | 0.80 | f3/f | −48.49 |
| (T34 + T45)/CT4 | 1.58 | f3/T12 | −3714.40 |
| ΣAT/BFL | 1.65 | f/|R5| + f/|R6| + f/|R7| | 0.78 |
| Sd/Td | 0.88 | the number of inflection points on Lens 3 | 3 |

3 rd Embodiment

Figure 3A:
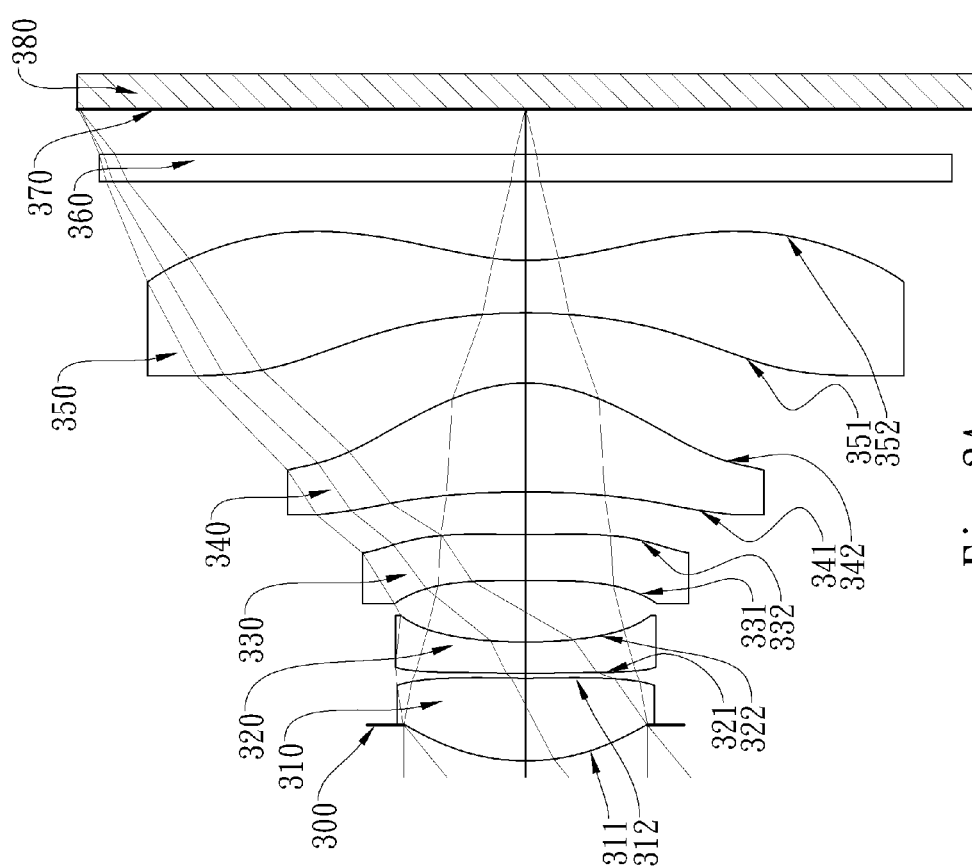
FIG. 3A is a schematic view of an image capturing device according to the 3rd embodiment of the present disclosure.
Figure 3B:
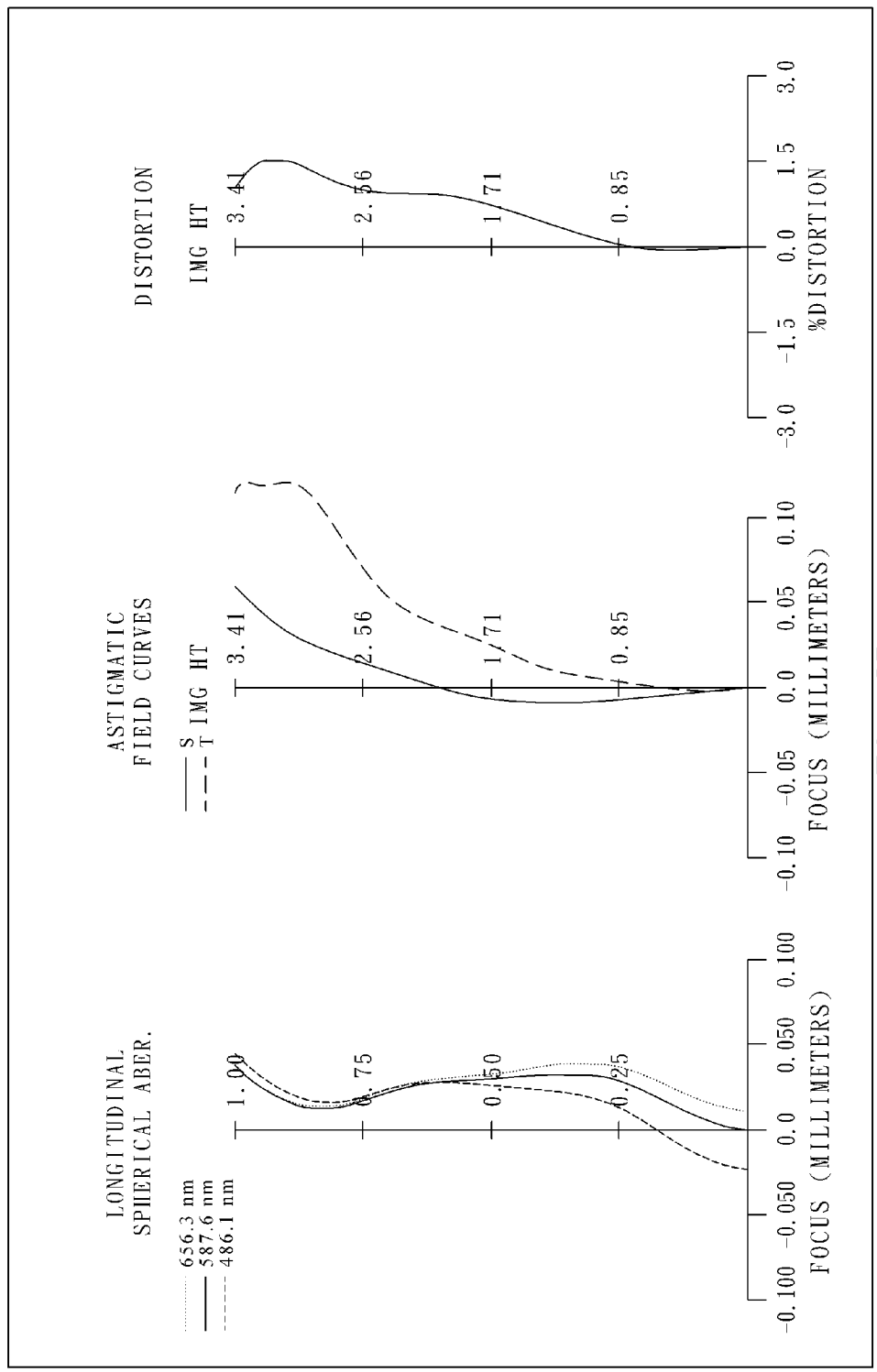
FIG. 3B shows spherical aberration curves, astigmatic field curves and a distortion curve of the image capturing device according to the 3rd embodiment.

FIG. 3A is a schematic view of an image capturing device according to the 3rd embodiment of the present disclosure. FIG. 3B shows, in order from left to right, spherical aberration curves, astigmatic field curves and a distortion curve of the image capturing device according to the 3rd embodiment.

In FIG. 3A, the image capturing device includes the imaging lens system (not otherwise herein labeled) of the present disclosure and an image sensor 380. The imaging lens system includes, in order from an object side to an image side, a first lens element 310, a second lens element 320, a third lens element 330, a fourth lens element 340, and a fifth lens element 350, wherein the imaging lens system has a total of five lens elements with refractive power and an air gap is arranged between every two adjacent lens elements with refractive power.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with negative refractive power has an object-side surface 321 being convex in a paraxial region thereof and an image-side surface 322 being concave in a paraxial region thereof, which are both aspheric, and the second lens element 320 is made of plastic material. Furthermore, the object-side surface 321 of the second lens element 320 has at least one concave shape in an off-axis region thereof.

The third lens element 330 with negative refractive power has an object-side surface 331 being concave in a paraxial region thereof and an image-side surface 332 being concave in a paraxial region thereof, which are both aspheric, and the third lens element 330 is made of plastic material. Furthermore, the image-side surface 332 of the third lens element 330 has at least one inflection point in an off-axis region thereof.

The fourth lens element 340 with positive refractive power has an object-side surface 341 being concave in a paraxial region thereof and an image-side surface 342 being convex in a paraxial region thereof, which are both aspheric, and the fourth lens element 340 is made of plastic material. Furthermore, the image-side surface 342 of the fourth lens element 340 has at least one critical point.

The fifth lens element 350 with negative refractive power has an object-side surface 351 being concave in a paraxial region thereof and an image-side surface 352 being concave in a paraxial region thereof, which are both aspheric, and the fifth lens element 350 is made of plastic material. Furthermore, the image-side surface 352 of the fifth lens element 350 has at least one convex shape in an off-axis region thereof.

The imaging lens system further includes a stop 300 disposed between an imaged object and the first lens element 310 and an IR-cut filter 360. The IR-cut filter 360 is made of glass and located between the fifth lens element 350 and an image surface 370, and will not affect the focal length of the imaging lens system.

The image sensor 380 is disposed on or near the image surface 370 of the imaging lens system.

The detailed optical data of the third embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(Embodiment 3)
f = 4.08 mm, Fno = 2.20, HFOV = 39.5 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.273 | | | | |
| 2 | Lens 1 | 1.602 | ASP | 0.628 | Plastic | 1.544 | 55.9 | 3.71 |
| 3 | | 6.696 | ASP | 0.036 | | | | |
| 4 | Lens 2 | 5.470 | ASP | 0.240 | Plastic | 1.640 | 23.3 | −12.12 |
| 5 | | 3.153 | ASP | 0.470 | | | | |
| 6 | Lens 3 | −72.212 | ASP | 0.350 | Plastic | 1.640 | 23.3 | −16.21 |
| 7 | | 12.134 | ASP | 0.326 | | | | |
| 8 | Lens 4 | −7.268 | ASP | 0.831 | Plastic | 1.544 | 55.9 | 2.52 |
| 9 | | −1.200 | ASP | 0.535 | | | | |
| 10 | Lens 5 | −4.376 | ASP | 0.400 | Plastic | 1.544 | 55.9 | −2.31 |
| 11 | | 1.815 | ASP | 0.600 | | | | |
| 12 | IR-cut filter | Plano | | 0.210 | Glass | 1.517 | 64.2 | — |
| 13 | | Plano | | 0.341 | | | | |
| 14 | Image Surface | Plano | | — | | | | |

Note:
Reference wavelength is d-line 587.6 nm

TABLE 7

Aspheric Coefficients

| Surface # | 2 | 3 | 4 | 5 | 6 |
|---|---|---|---|---|---|
| k = | −1.0795E+01 | −4.9382E+01 | −9.0000E+01 | 1.2278E+00 | −9.0000E+01 |
| A4 = | 3.0436E−01 | −4.0451E−01 | −3.8179E−01 | −9.6783E−02 | −1.8764E−01 |
| A6 = | −3.7124E−01 | 9.5307E−01 | 1.0216E+00 | 2.9744E−01 | −1.9189E−02 |
| A8 = | 3.5791E−01 | −1.1982E+00 | −1.0146E+00 | −1.0590E−01 | 1.8796E−01 |
| A10 = | −1.7598E−01 | 6.6358E−01 | 1.1342E−01 | −1.9943E−01 | −3.5920E−01 |
| A12 = | | −1.3442E−01 | 4.3467E−01 | 1.8942E−01 | 3.5478E−01 |
| A14 = | | | −1.8047E−01 | | −1.4651E−01 |

| Surface # | 7 | 8 | 9 | 10 | 11 |
|---|---|---|---|---|---|
| k = | −4.1536E+01 | 8.1089E+00 | −2.1782E+00 | −6.5288E−01 | −9.6482E+00 |
| A4 = | −1.4437E−01 | −9.3816E−03 | 2.7044E−02 | 2.4080E−03 | −3.6216E−02 |
| A6 = | 2.7602E−02 | 3.5832E−03 | −3.2901E−02 | −1.4960E−02 | 8.7673E−03 |
| A8 = | −2.7112E−03 | −1.3016E−02 | 2.5862E−02 | 8.3843E−03 | −1.9865E−03 |
| A10 = | 6.9894E−03 | 1.4990E−02 | −6.5797E−03 | −1.7114E−03 | 2.7276E−04 |
| A12 = | 7.1288E−11 | −5.3479E−03 | 5.2052E−04 | 1.5899E−04 | −1.7267E−05 |
| A14 = | | 6.1576E−04 | | −5.7324E−06 | 2.1958E−07 |
| A16 = | | | | | 1.1451E−08 |

In the 3rd embodiment, the equation of the aspheric surface profiles of the aforementioned lens elements is the same as the equation of the 1st embodiment. Also, the definitions of these parameters shown in Table 8 below are the same as those stated in the 1st embodiment with corresponding values for the 3rd embodiment, so an explanation in this regard will not be provided again.

Moreover, these parameters can be calculated from Table 6 and Table 7 and satisfy the conditions stated in Table 8.

TABLE 8

3rd Embodiment

| | | | |
|---|---|---|---|
| f [mm] | 4.08 | \|SAG41\|/CT4 | 0.21 |
| Fno | 2.20 | \|SAG51\|/T45 | 0.90 |
| HFOV [deg.] | 39.5 | \|R3\|/f | 1.34 |
| \|V2 − V3\| | 0.0 | \|(f1 − f4)/(f1 + f4)\| | 0.19 |
| (CT2 + CT3)/CT4 | 0.71 | f3/f | −3.97 |
| (T34 + T45)/CT4 | 1.04 | f3/T12 | −450.28 |
| ΣAT/BFL | 1.27 | f/\|R5\| + f/\|R6\| + f/\|R7\| | 0.95 |
| Sd/Td | 0.93 | the number of inflection points on Lens 3 | 2 |

4th Embodiment

Figure 4A:
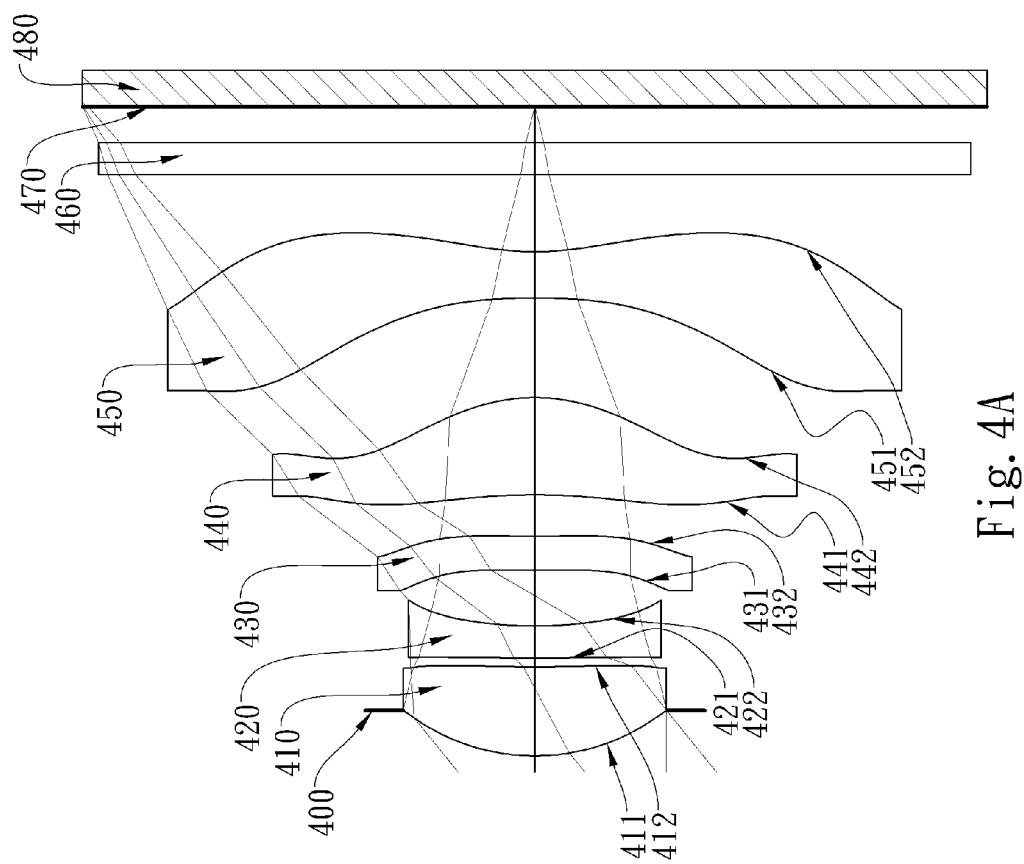
FIG. 4A is a schematic view of an image capturing device according to the 4th embodiment of the present disclosure.
Figure 4B:
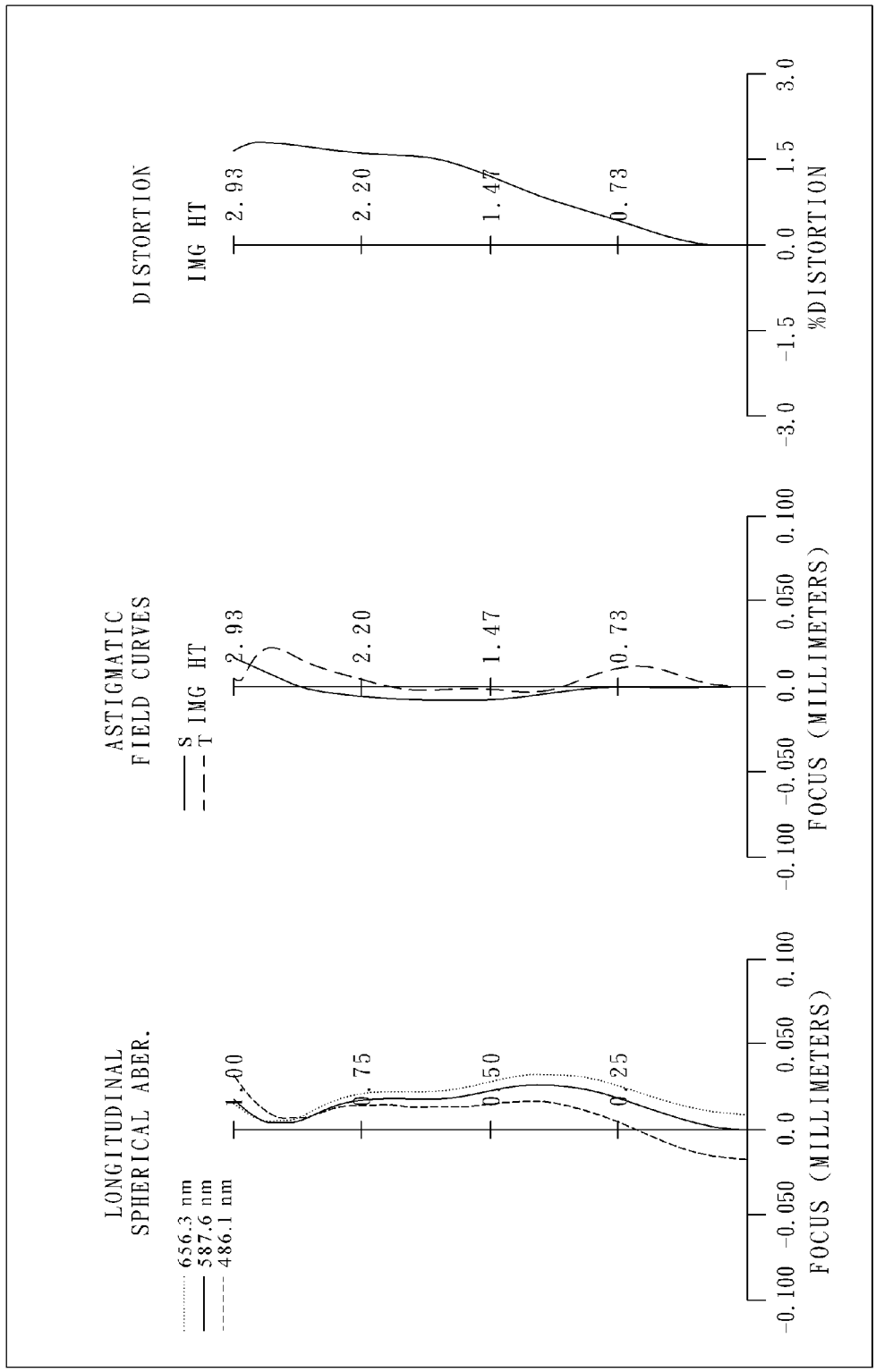
FIG. 4B shows spherical aberration curves, astigmatic field curves and a distortion curve of the image capturing device according to the 4th embodiment.

FIG. 4A is a schematic view of an image capturing device according to the 4th embodiment of the present disclosure. FIG. 4B shows, in order from left to right, spherical aberration curves, astigmatic field curves and a distortion curve of the image capturing device according to the 4th embodiment.

In FIG. 4A, the image capturing device includes the imaging lens system (not otherwise herein labeled) of the present disclosure and an image sensor 480. The imaging lens system includes, in order from an object side to an image side, a first lens element 410, a second lens element 420, a third lens element 430, a fourth lens element 440, and a fifth lens element 450, wherein the imaging lens system has a total of five lens elements with refractive power and an air gap is arranged between every two adjacent lens elements with refractive power.

The first lens element 410 with positive refractive power has an object-side surface 411 being convex in a paraxial region thereof and an image-side surface 412 being concave in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material. Furthermore, the object-side surface 421 of the second lens element 420 has at least one concave shape in an off-axis region thereof.

The third lens element 430 with negative refractive power has an object-side surface 431 being convex in a paraxial region thereof and an image-side surface 432 being concave in a paraxial region thereof, which are both aspheric, and the third lens element 430 is made of plastic material. Furthermore, the image-side surface 432 of the third lens element 430 has at least one inflection point in an off-axis region thereof.

The fourth lens element 440 with positive refractive power has an object-side surface 441 being concave in a paraxial region thereof and an image-side surface 442 being convex in a paraxial region thereof, which are both aspheric, and the fourth lens element 440 is made of plastic material. Furthermore, the image-side surface 442 of the fourth lens element 440 has at least one critical point.

The fifth lens element 450 with negative refractive power has an object-side surface 451 being concave in a paraxial region thereof and an image-side surface 452 being concave in a paraxial region thereof, which are both aspheric, and the fifth lens element 450 is made of plastic material. Furthermore, the image-side surface 452 of the fifth lens element 450 has at least one convex shape in an off-axis region thereof.

The imaging lens system further includes a stop 400 disposed between an imaged object and the second lens element 420 and an IR-cut filter 460. The IR-cut filter 460 is made of glass and located between the fifth lens element 450 and an image surface 470, and will not affect the focal length of the imaging lens system.

The image sensor 480 is disposed on or near the image surface 470 of the imaging lens system.

The detailed optical data of the fourth embodiment are shown in TABLE 9, and the aspheric surface data are shown in TABLE 10, wherein the units of the curvature radius, the thickness and the focal length are expressed in mm, and HFOV is half of the maximal field of view.

TABLE 9

(Embodiment 4)
f = 3.54 mm, Fno = 2.07, HFOV = 39.1 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.295 | | | | |
| 2 | Lens 1 | 1.379 | ASP | 0.578 | Plastic | 1.544 | 55.9 | 2.98 |
| 3 | | 7.884 | ASP | 0.056 | | | | |
| 4 | Lens 2 | 7.110 | ASP | 0.210 | Plastic | 1.639 | 23.5 | −6.08 |
| 5 | | 2.484 | ASP | 0.362 | | | | |
| 6 | Lens 3 | 11.995 | ASP | 0.221 | Plastic | 1.639 | 23.5 | −65.12 |
| 7 | | 9.244 | ASP | 0.269 | | | | |
| 8 | Lens 4 | −4.442 | ASP | 0.634 | Plastic | 1.544 | 55.9 | 2.68 |
| 9 | | −1.152 | ASP | 0.647 | | | | |
| 10 | Lens 5 | −5.231 | ASP | 0.300 | Plastic | 1.544 | 55.9 | −2.33 |
| 11 | | 1.703 | ASP | 0.500 | | | | |
| 12 | IR-cut filter | Plano | | 0.210 | Glass | 1.517 | 64.2 | — |

TABLE 9-continued (Embodiment 4)
f = 3.54 mm, Fno = 2.07, HFOV = 39.1 deg.

| Surface# | | Curvature Radius | Thickness | Material | Index | Abbe # | Focal Length |
|---|---|---|---|---|---|---|---|
| 13 | | Plano | 0.235 | | | | |
| 14 | Image Surface | Plano | — | | | | |

Note:
Reference wavelength is d-line 587.6 nm
Note:
Effective radius of the fifth surface is 0.820 mm

TABLE 10

Aspheric Coefficients

| Surface # | | | | | |
|---|---|---|---|---|---|
| | 2 | 3 | 4 | 5 | 6 |
| k = | −3.7907E+00 | −9.9000E+01 | −6.5559E+01 | −1.1867E+01 | −5.4869E+01 |
| A4 = | 1.8401E−01 | −2.4812E−01 | −4.1922E−01 | −1.2021E−01 | −3.8487E−01 |
| A6 = | −1.1637E−01 | 5.3488E−01 | 1.3387E+00 | 7.8242E−01 | 1.1435E−01 |
| A8 = | 4.2093E−01 | 4.1687E−02 | −1.7120E+00 | −9.6495E−01 | −1.7623E−01 |
| A10 = | −1.1588E+00 | −1.7963E+00 | 7.2031E−01 | 5.0900E−01 | 3.1621E−01 |
| A12 = | 1.6321E+00 | 2.1770E+00 | −6.5375E−02 | 3.9254E−02 | −5.6217E−02 |
| A14 = | −9.0736E−01 | −9.4480E−01 | | | |

| Surface # | | | | | |
|---|---|---|---|---|---|
| | 7 | 8 | 9 | 10 | 11 |
| k = | −9.9000E+01 | 3.7090E+00 | −2.6324E+00 | 3.4727E+00 | −1.2377E+01 |
| A4 = | −2.7814E−01 | −3.7294E−03 | −5.5040E−02 | −2.1252E−01 | −1.1298E−01 |
| A6 = | 9.0689E−02 | 1.0888E−01 | 2.2874E−02 | 2.3571E−01 | 7.7403E−02 |
| A8 = | −6.2309E−02 | −6.3506E−02 | 1.0025E−01 | −1.6415E−01 | −3.8424E−02 |
| A10 = | 7.6525E−02 | 1.6830E−02 | −7.4105E−02 | 6.8454E−02 | 1.1383E−02 |
| A12 = | | −2.0858E−03 | 2.0243E−02 | −1.5894E−02 | −1.9876E−03 |
| A14 = | | | −2.2321E−03 | 1.9128E−03 | 1.8852E−04 |
| A16 = | | | 5.1274E−05 | −9.3461E−05 | −7.3872E−06 |

In the 4th embodiment, the equation of the aspheric surface profiles of the aforementioned lens elements is the same as the equation of the 1st embodiment. Also, the definitions of these parameters shown in Table 11 below are the same as those stated in the 1st embodiment with corresponding values for the 4th embodiment, so an explanation in this regard will not be provided again.

Moreover, these parameters can be calculated from Table 9 and Table 10 and satisfy the conditions stated in Table 11.

TABLE 11

4$^{th}$ Embodiment

| f [mm] | 3.54 | |SAG41|/CT4 | 0.01 |
|---|---|---|---|
| Fno | 2.07 | |SAG51|/T45 | 0.93 |
| HFOV [deg.] | 39.1 | |R3|/f | 2.01 |
| |V2 − V3| | 0.0 | |(f1 − f4)/(f1 + f4)| | 0.05 |
| (CT2 + CT3)/CT4 | 0.68 | f3/f | −18.40 |
| (T34 + T45)/CT4 | 1.44 | f3/T12 | −1162.86 |
| ΣAT/BFL | 1.53 | f/|R5| + f/|R6| + f/|R7| | 1.48 |
| Sd/Td | 0.91 | the number of inflection points on Lens 3 | 4 |

5th Embodiment

Figure 5A:
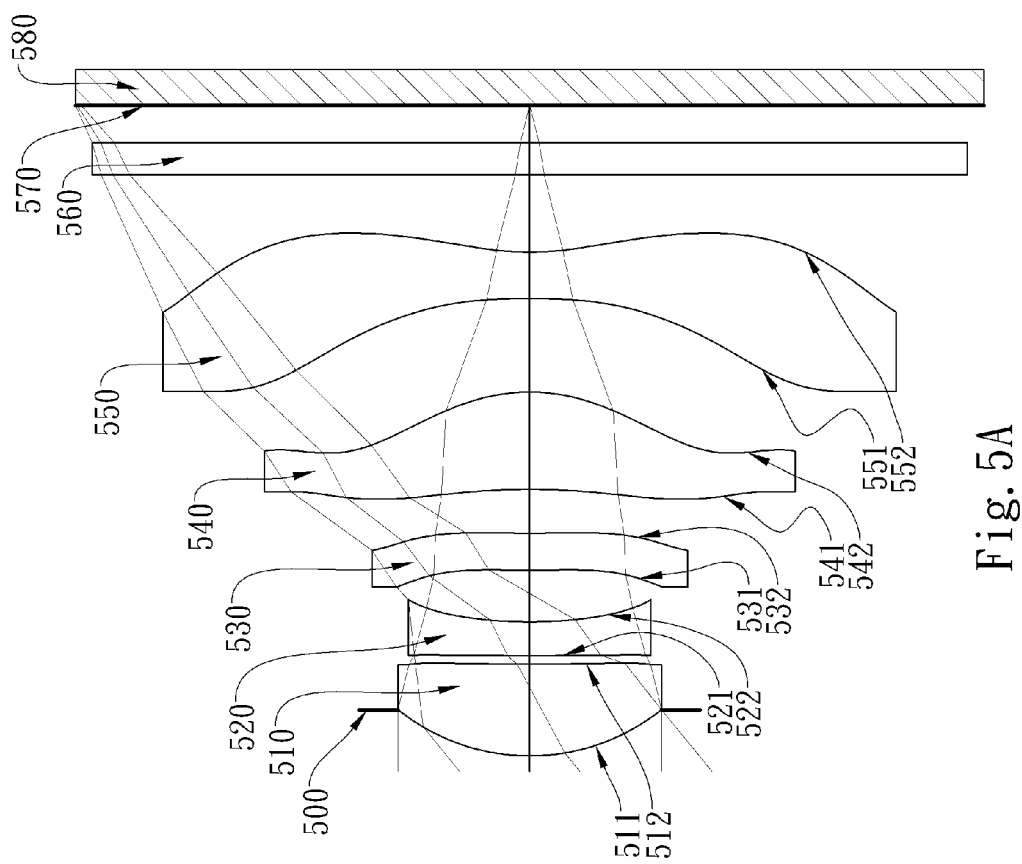
FIG. 5A is a schematic view of an image capturing device according to the 5th embodiment of the present disclosure.
Figure 5B:
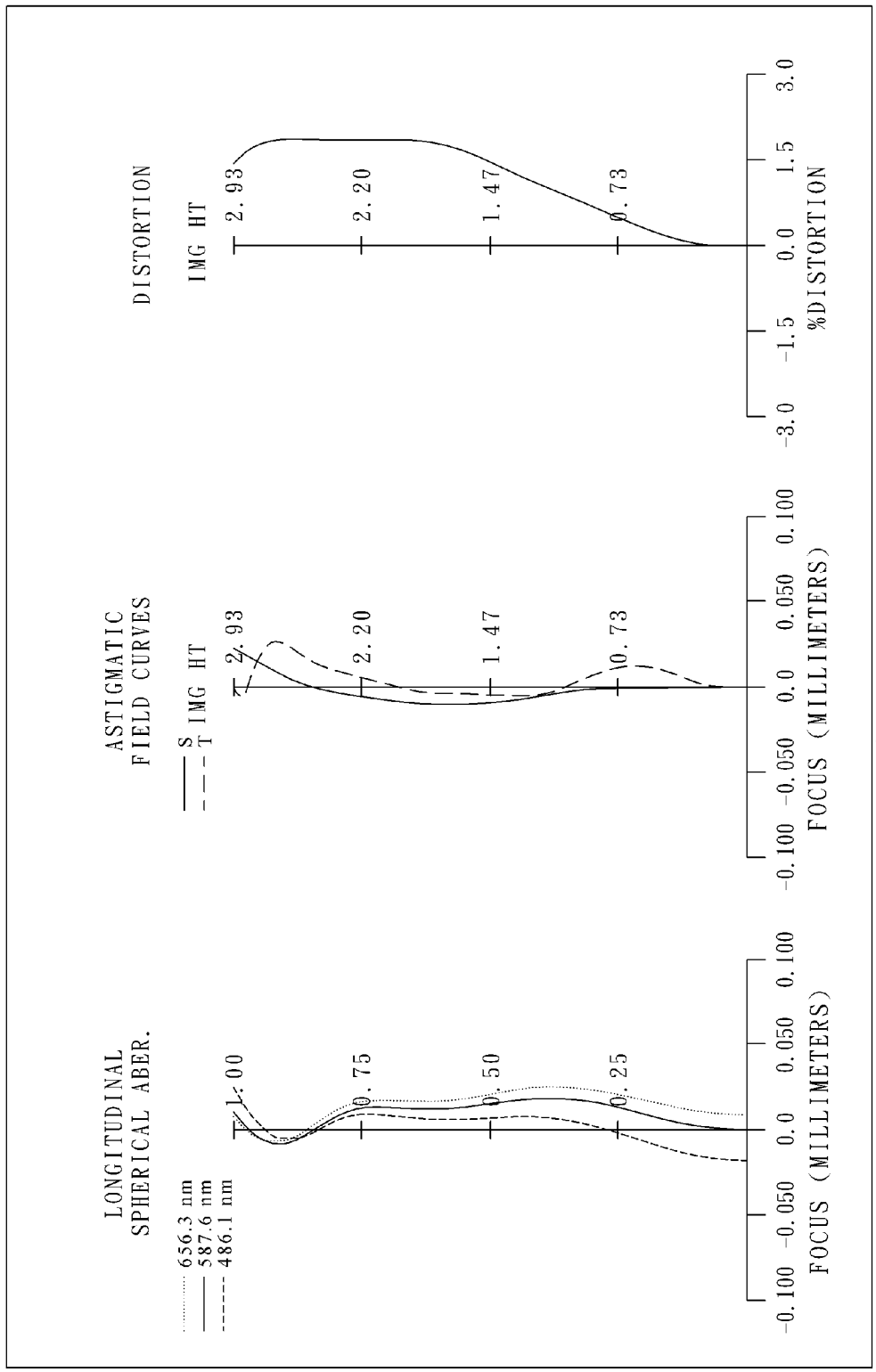
FIG. 5B shows spherical aberration curves, astigmatic field curves and a distortion curve of the image capturing device according to the 5th embodiment.

FIG. 5A is a schematic view of an image capturing device according to the 5th embodiment of the present disclosure. FIG. 5B shows, in order from left to right, spherical aberration curves, astigmatic field curves and a distortion curve of the image capturing device according to the 5th embodiment.

In FIG. 5A, the image capturing device includes the imaging lens system (not otherwise herein labeled) of the present disclosure and an image sensor 580. The imaging lens system includes, in order from an object side to an image side, a first lens element 510, a second lens element 520, a third lens element 530, a fourth lens element 540, and a fifth lens element 550, wherein the imaging lens system has a total of five lens elements with refractive power and an air gap is arranged between every two adjacent lens elements with refractive power.

The first lens element 510 with positive refractive power has an object-side surface 511 being convex in a paraxial region thereof and an image-side surface 512 being concave in a paraxial region thereof, which are both aspheric, and the first lens element 510 is made of plastic material.

The second lens element 520 with negative refractive power has an object-side surface 521 being convex in a paraxial region thereof and an image-side surface 522 being concave in a paraxial region thereof, which are both aspheric, and the second lens element 520 is made of plastic material. Furthermore, the object-side surface 521 of the second lens element 520 has at least one concave shape in an off-axis region thereof.

The third lens element 530 with negative refractive power has an object-side surface 531 being convex in a paraxial region thereof and an image-side surface 532 being concave in a paraxial region thereof, which are both aspheric, and the third lens element 530 is made of plastic material. Furthermore, the image-side surface 532 of the third lens element 530 has at least one inflection point in an off-axis region thereof.

The fourth lens element 540 with positive refractive power has an object-side surface 541 being concave in a paraxial region thereof and an image-side surface 542 being convex in a paraxial region thereof, which are both aspheric, and the fourth lens element 540 is made of plastic material. Furthermore, the image-side surface 542 of the fourth lens element 540 has at least one critical point.

The fifth lens element 550 with negative refractive power has an object-side surface 551 being concave in a paraxial region thereof and an image-side surface 552 being concave in a paraxial region thereof, which are both aspheric, and the fifth lens element 550 is made of plastic material. Furthermore, the image-side surface 552 of the fifth lens element 550 has at least one convex shape in an off-axis region thereof.

The imaging lens system further includes a stop 500 disposed between an imaged object and the first lens element 510 and an IR-cut filter 560. The IR-cut filter 560 is made of glass and located between the fifth lens element 550 and an image surface 570, and will not affect the focal length of the imaging lens system.

The image sensor 580 is disposed on or near the image surface 570 of the imaging lens system.

The detailed optical data of the fifth embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(Embodiment 5)
f = 3.54 mm, Fno = 2.07, HFOV = 39.2 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.298 | | | | |
| 2 | Lens 1 | 1.374 | ASP | 0.592 | Plastic | 1.544 | 55.9 | 2.99 |
| 3 | | 7.541 | ASP | 0.056 | | | | |
| 4 | Lens 2 | 7.920 | ASP | 0.220 | Plastic | 1.639 | 23.5 | −6.02 |
| 5 | | 2.561 | ASP | 0.336 | | | | |
| 6 | Lens 3 | 10.078 | ASP | 0.240 | Plastic | 1.639 | 23.5 | −117.79 |
| 7 | | 8.806 | ASP | 0.284 | | | | |
| 8 | Lens 4 | −4.559 | ASP | 0.632 | Plastic | 1.544 | 55.9 | 2.65 |
| 9 | | −1.149 | ASP | 0.607 | | | | |
| 10 | Lens 5 | −5.251 | ASP | 0.300 | Plastic | 1.544 | 55.9 | −2.30 |
| 11 | | 1.678 | ASP | 0.500 | | | | |
| 12 | IR-cut filter | Plano | | 0.210 | Glass | 1.517 | 64.2 | — |
| 13 | | Plano | | 0.241 | | | | |
| 14 | Image Surface | Plano | | — | | | | |

Note:
Reference wavelength is d-line 587.6 nm
Note:
Effective radius of the ninth surface is 1.720 mm

TABLE 13

Aspheric Coefficients

| | Surface # | | | | |
|---|---|---|---|---|---|
| | 2 | 3 | 4 | 5 | 6 |
| k = | −3.6219E+00 | −9.3743E+01 | −3.1838E+01 | −1.2312E+01 | −1.6184E+00 |
| A4 = | 1.8105E−01 | −2.4650E−01 | −4.2193E−01 | −1.2059E−01 | −3.6576E−01 |
| A6 = | −1.2083E−01 | 5.3964E−01 | 1.3376E+00 | 7.8209E−01 | 1.1966E−01 |
| A8 = | 4.2925E−01 | 7.1018E−02 | −1.7123E+00 | −9.6635E−01 | −1.4620E−01 |
| A10 = | −1.1310E+00 | −1.9078E+00 | 7.0064E−01 | 4.9877E−01 | 2.7268E−01 |
| A12 = | 1.5668E+00 | 2.2802E+00 | −6.3333E−02 | 5.3517E−02 | −5.7145E−02 |
| A14 = | −8.5912E−01 | −9.7615E−01 | | | |

| | Surface # | | | | |
|---|---|---|---|---|---|
| | 7 | 8 | 9 | 10 | 11 |
| k = | 3.1182E+00 | 4.0658E+00 | −2.6749E+00 | 3.5801E+00 | −1.2619E+01 |
| A4 = | −2.6668E−01 | −3.2013E−04 | −4.9289E−02 | −2.1612E−01 | −1.1262E−01 |
| A6 = | 8.8300E−02 | 9.2447E−02 | 1.6521E−02 | 2.4255E−01 | 7.8728E−02 |
| A8 = | −5.2913E−02 | −4.8024E−02 | 9.8059E−02 | −1.7260E−01 | −4.0422E−02 |
| A10 = | 6.8350E−02 | 1.0450E−02 | −6.7764E−02 | 7.3629E−02 | 1.2419E−02 |
| A12 = | −2.4120E−03 | −1.1006E−03 | 1.6256E−02 | −1.7443E−02 | −2.2561E−03 |
| A14 = | | | −1.1633E−03 | 2.1356E−03 | 2.2316E−04 |
| A16 = | | | −5.3969E−05 | −1.0590E−04 | −9.1479E−06 |

In the 5th embodiment, the equation of the aspheric surface profiles of the aforementioned lens elements is the same as the equation of the 1st embodiment. Also, the definitions of these parameters shown in Table 14 below are the same as those stated in the 1st embodiment with corresponding values for the 5th embodiment, so an explanation in this regard will not be provided again.

Moreover, these parameters can be calculated from Table 12 and Table 13 and satisfy the conditions stated in Table 14.

TABLE 14

| Embodiment 5 | | | |
|---|---|---|---|
| f [mm] | 3.54 | |SAG41|/CT4 | 0.02 |
| Fno | 2.07 | |SAG51|/T45 | 0.99 |
| HFOV [deg.] | 39.2 | |R3|/f | 2.24 |
| |V2 − V3| | 0.0 | |(f1 − f4)/(f1 + f4)| | 0.06 |
| (CT2 + CT3)/CT4 | 0.73 | f3/f | −33.27 |
| (T34 + T45)/CT4 | 1.41 | f3/T12 | −2103.39 |
| ΣAT/BFL | 1.46 | f/|R5| + f/|R6| + f/|R7| | 1.53 |
| Sd/Td | 0.91 | the number of inflection points on Lens 3 | 4 |

6th Embodiment

Figure 6A:
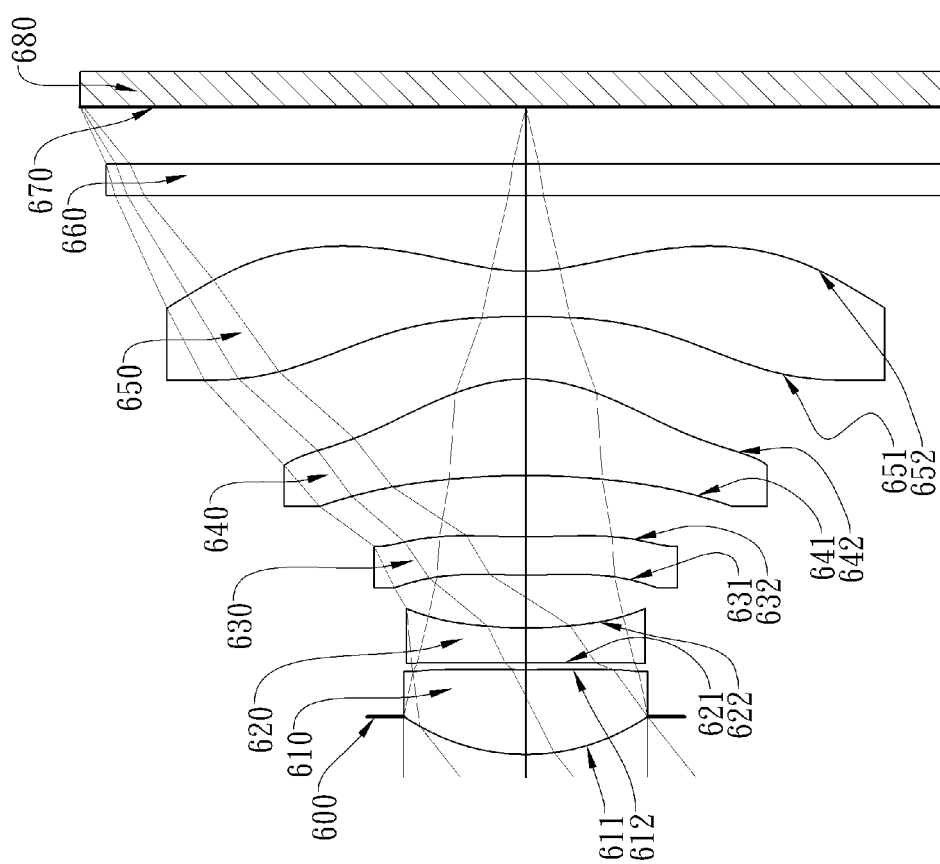
FIG. 6A is a schematic view of an image capturing device according to the 6th embodiment of the present disclosure.
Figure 6B:
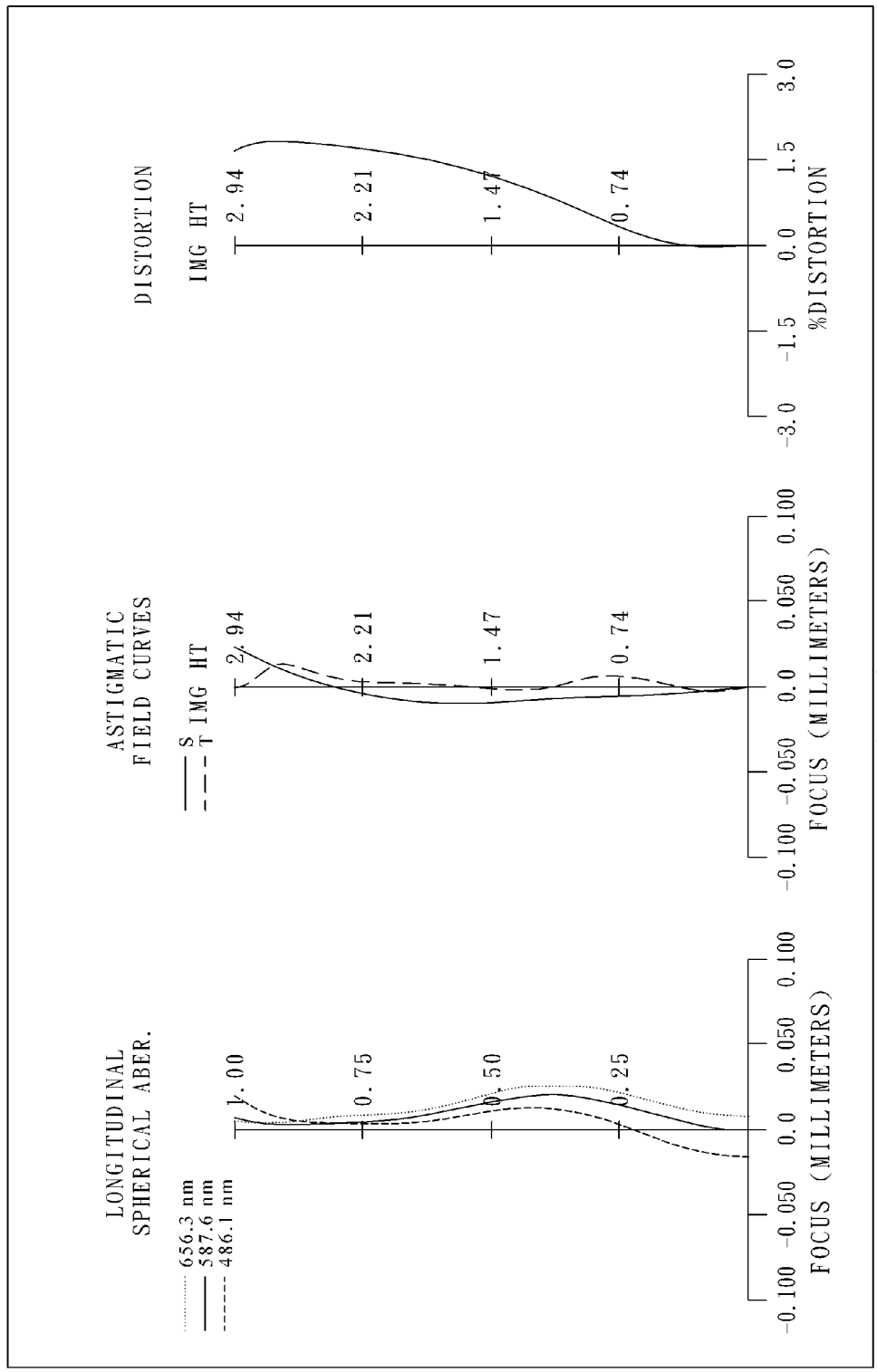
FIG. 6B shows spherical aberration curves, astigmatic field curves and a distortion curve of the image capturing device according to the 6th embodiment.

FIG. 6A is a schematic view of an image capturing device according to the 6th embodiment of the present disclosure. FIG. 6B shows, in order from left to right, spherical aberration curves, astigmatic field curves and a distortion curve of the image capturing device according to the 6th embodiment.

In FIG. 6A, the image capturing device includes the imaging lens system (not otherwise herein labeled) of the present disclosure and an image sensor 680. The imaging lens system includes, in order from an object side to an image side, a first lens element 610, a second lens element 620, a third lens element 630, a fourth lens element 640, and a fifth lens element 650, wherein the imaging lens system has a total of five lens elements with refractive power and an air gap is arranged between every two adjacent lens elements with refractive power.

The first lens element 610 with positive refractive power has an object-side surface 611 being convex in a paraxial region thereof and an image-side surface 612 being concave in a paraxial region thereof, which are both aspheric, and the first lens element 610 is made of plastic material.

The second lens element 620 with negative refractive power has an object-side surface 621 being convex in a paraxial region thereof and an image-side surface 622 being concave in a paraxial region thereof, which are both aspheric, and the second lens element 620 is made of plastic material. Furthermore, the object-side surface 621 of the second lens element 620 has at least one concave shape in an off-axis region thereof.

The third lens element 630 with negative refractive power has an object-side surface 631 being convex in a paraxial region thereof and an image-side surface 632 being concave in a paraxial region thereof, which are both aspheric, and the third lens element 630 is made of plastic material. Furthermore, the image-side surface 632 of the third lens element 630 has at least one inflection point in an off-axis region thereof.

The fourth lens element 640 with positive refractive power has an object-side surface 641 being concave in a paraxial region thereof and an image-side surface 642 being convex in a paraxial region thereof, which are both aspheric, and the fourth lens element 640 is made of plastic material. Furthermore, the image-side surface 642 of the fourth lens element 640 has at least one critical point.

The fifth lens element 650 with negative refractive power has an object-side surface 651 being concave in a paraxial region thereof and an image-side surface 652 being concave in a paraxial region thereof, which are both aspheric, and the fifth lens element 650 is made of plastic material. Furthermore, the image-side surface 652 of the fifth lens element 650 has at least one convex shape in an off-axis region thereof.

The imaging lens system further includes a stop 600 disposed between an imaged object and the first lens element 610 and an IR-cut filter 660. The IR-cut filter 660 is made of glass and located between the fifth lens element 650 and an image surface 670, and will not affect the focal length of the imaging lens system.

The image sensor 680 is disposed on or near the image surface 670 of the imaging lens system.

The detailed optical data of the sixth embodiment are shown in TABLE 15, and the aspheric surface data are shown in TABLE 16, wherein the units of the curvature radius, the thickness and the focal length are expressed in mm, and HFOV is half of the maximal field of view.

TABLE 15

(Embodiment 6)
f = 3.64 mm, Fno = 2.25, HFOV = 38.5 deg.

| Surface# | | Curvature Radius | | Thickness | Material | Index | Index | Focal Length |
|---|---|---|---|---|---|---|---|---|
| 0 | Object | Plano | | Infinity | | | | |
| 1 | Stop | Plano | | −0.249 | | | | |
| 2 | Lens 1 | 1.406 | ASP | 0.561 | Plastic | 1.544 | 55.9 | 2.88 |
| 3 | | 11.853 | ASP | 0.045 | | | | |
| 4 | Lens 2 | 10.053 | ASP | 0.232 | Plastic | 1.639 | 23.5 | −5.77 |
| 5 | | 2.672 | ASP | 0.351 | | | | |
| 6 | Lens 3 | 7.328 | ASP | 0.254 | Plastic | 1.639 | 23.5 | −95.02 |
| 7 | | 6.451 | ASP | 0.406 | | | | |
| 8 | Lens 4 | −5.182 | ASP | 0.641 | Plastic | 1.544 | 55.9 | 2.33 |
| 9 | | −1.063 | ASP | 0.413 | | | | |
| 10 | Lens 5 | −6.743 | ASP | 0.300 | Plastic | 1.544 | 55.9 | −2.04 |
| 11 | | 1.349 | ASP | 0.500 | | | | |
| 12 | IR-cut filter | Plano | | 0.210 | Glass | 1.517 | 64.2 | — |
| 13 | | Plano | | 0.378 | | | | |
| 14 | Image Surface | Plano | | — | | | | |

Note:
Reference wavelength is d-line 587.6 nm

Note:
Effective radius of the ninth surface is 1.600 mm

TABLE 16

Aspheric Coefficients

| Surface # | | | | |
|---|---|---|---|---|
| 2 | 3 | 4 | 5 | 6 |
| k = −3.7352E+00 | 6.4118E+01 | 3.1545E+01 | −9.2753E+00 | −6.1566E+01 |
| A4 = 1.6435E−01 | −3.3384E−01 | −4.4848E−01 | −1.3656E−01 | −3.3842E−01 |
| A6 = −6.8628E−02 | 1.0205E+00 | 1.6382E+00 | 7.8294E−01 | 2.8456E−01 |
| A8 = 1.8637E−01 | −1.4433E+00 | −2.7616E+00 | −1.1927E+00 | −5.9328E−01 |
| A10 = −6.4475E−01 | 3.2590E−01 | 2.0374E+00 | 8.7824E−01 | 8.5305E−01 |
| A12 = 1.0983E+00 | 6.4899E−01 | −5.9971E−01 | −1.8173E−01 | −3.9849E−01 |
| A14 = −7.4882E−01 | −4.9626E−01 | | | |

| Surface # | | | | |
|---|---|---|---|---|
| 7 | 8 | 9 | 10 | 11 |
| k = 6.0243E+00 | 5.7154E+00 | −2.4004E+00 | 7.6945E+00 | −8.5802E+00 |
| A4 = −2.7236E−01 | 5.2580E−03 | 6.2074E−02 | −1.1037E−01 | −1.1139E−01 |
| A6 = 1.6646E−01 | 2.3669E−02 | −1.0718E−01 | 5.7341E−02 | 6.0225E−02 |
| A8 = −2.3628E−01 | −4.9586E−02 | 1.5304E−01 | −1.1523E−02 | −2.5976E−02 |
| A10 = 2.4234E−01 | 3.0517E−02 | −9.1117E−02 | 1.3450E−03 | 7.5258E−03 |
| A12 = −4.4512E−02 | −6.4053E−03 | 2.4502E−02 | −1.1138E−04 | −1.3864E−03 |
| A14 = | 1.6850E−04 | −2.4199E−03 | 6.4399E−06 | 1.4538E−04 |
| A16 = | | −5.2860E−05 | | −6.4852E−06 |

In the 6th embodiment, the equation of the aspheric surface profiles of the aforementioned lens elements is the same as the equation of the 1st embodiment. Also, the definitions of these parameters shown in Table 17 below are the same as those stated in the 1st embodiment with corresponding values for the 6th embodiment, so an explanation in this regard will not be provided again.

Moreover, these parameters can be calculated from Table 15 and Table 16 and satisfy the conditions stated in Table 17.

TABLE 17

6th Embodiment

| f [mm] | 3.64 | |SAG41|/CT4 | 0.32 |
|---|---|---|---|
| Fno | 2.25 | |SAG51|/T45 | 1.03 |
| HFOV [deg.] | 38.5 | |R3|/f | 2.76 |
| |V2− V3| | 0.0 | |(f1− f4)/(f1 + f4)| | 0.11 |
| (CT2 + CT3)/CT4 | 0.76 | f3/f | −26.10 |
| (T34 + T45)/CT4 | 1.28 | f3/T12 | −2111.56 |
| ΣAT/BFL | 1.20 | f/|R5| + f/|R6| + f/|R7| | 1.76 |
| Sd/Td | 0.92 | the number of inflection points on Lens 3 | 3 |

7th Embodiment

Figure 7A:
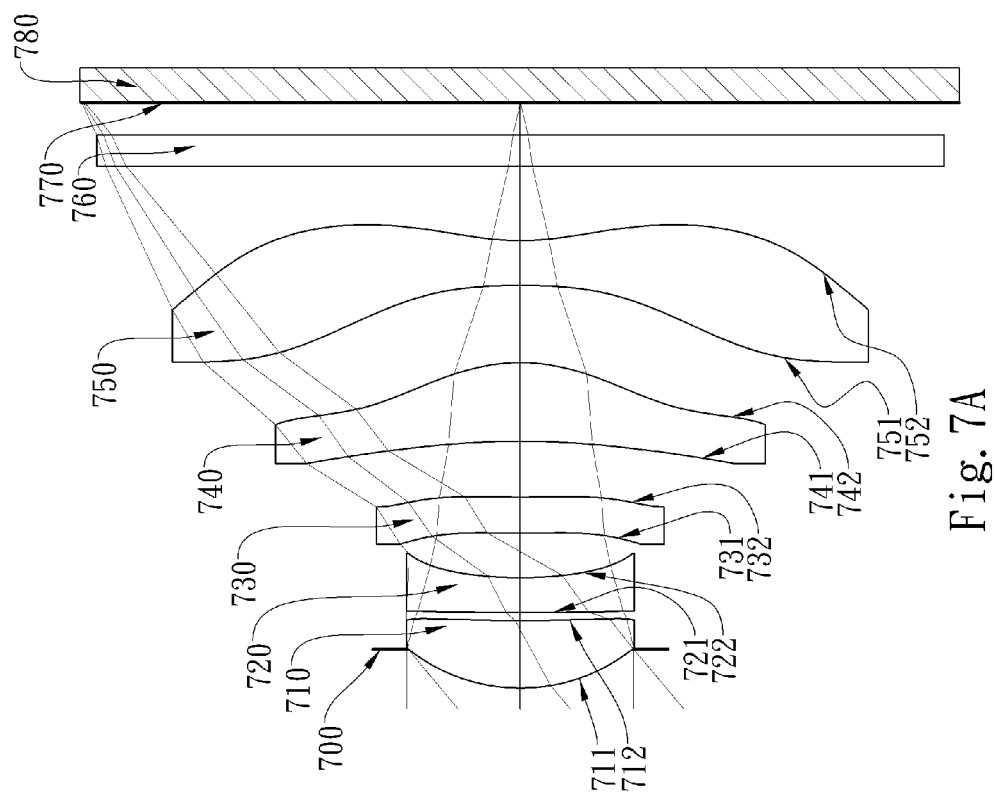
FIG. 7A is a schematic view of an image capturing device according to the 7th embodiment of the present disclosure.
Figure 7B:
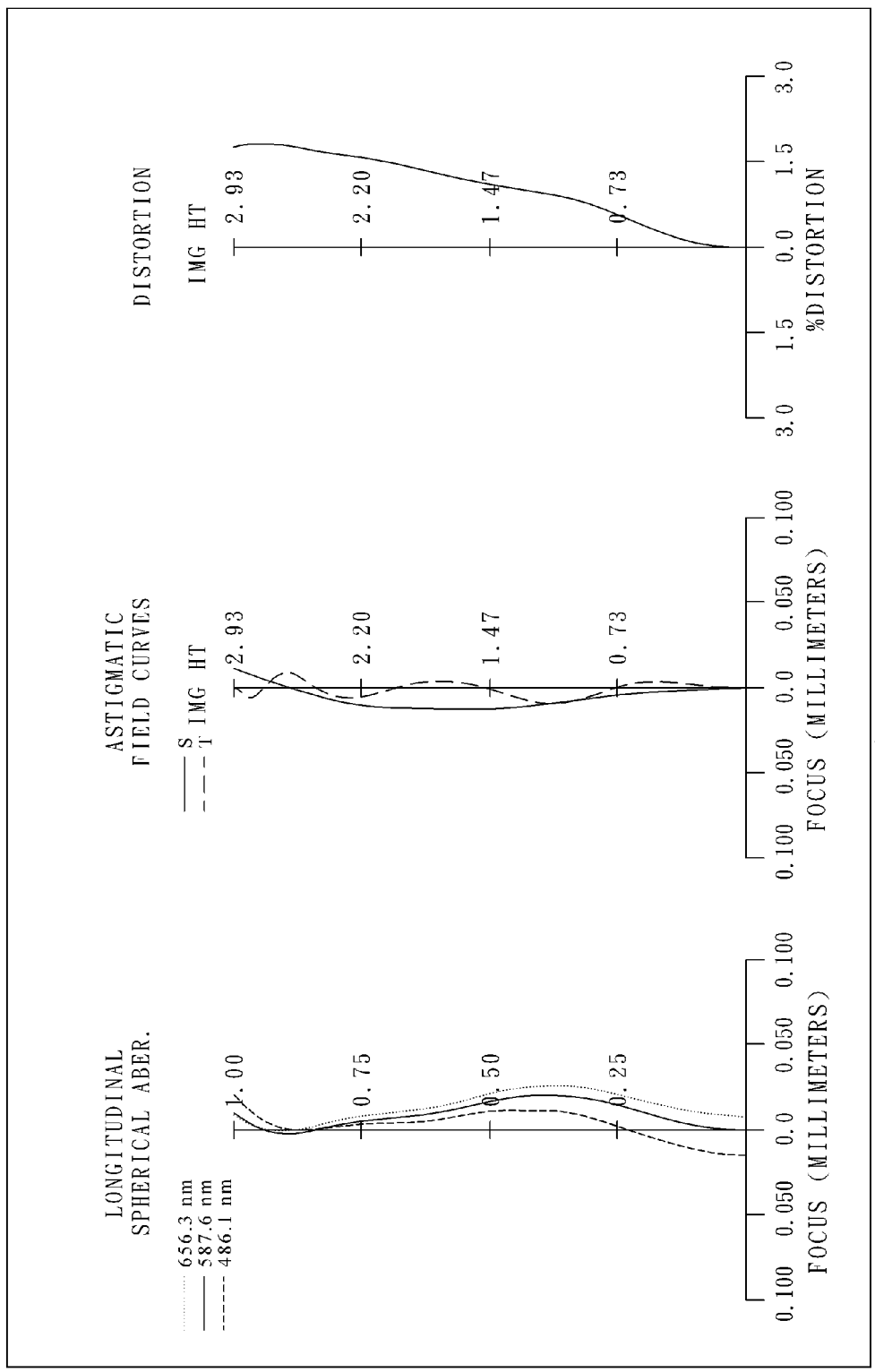
FIG. 7B shows spherical aberration curves, astigmatic field curves and a distortion curve of the image capturing device according to the 7th embodiment.

FIG. 7A is a schematic view of an image capturing device according to the 7th embodiment of the present disclosure. FIG. 7B shows, in order from left to right, spherical aberration curves, astigmatic field curves and a distortion curve of the image capturing device according to the 7th embodiment.

In FIG. 7A, the image capturing device includes the imaging lens system (not otherwise herein labeled) of the present disclosure and an image sensor 780. The imaging lens system includes, in order from an object side to an image side, a first lens element 710, a second lens element 720, a third lens element 730, a fourth lens element 740, and a fifth lens element 750, wherein the imaging lens system has a total of five lens elements with refractive power and an air gap is arranged between every two adjacent lens elements with refractive power.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with negative refractive power has an object-side surface 721 being convex in a paraxial region thereof and an image-side surface 722 being concave in a paraxial region thereof, which are both aspheric, and the second lens element 720 is made of plastic material. Furthermore, the object-side surface 721 of the second lens element 720 has at least one concave shape in an off-axis region thereof.

The third lens element 730 with negative refractive power has an object-side surface 731 being convex in a paraxial region thereof and an image-side surface 732 being concave in a paraxial region thereof, which are both aspheric, and the third lens element 730 is made of plastic material. Furthermore, the image-side surface 732 of the third lens element 730 has at least one inflection point in an off-axis region thereof.

The fourth lens element 740 with positive refractive power has an object-side surface 741 being concave in a paraxial region thereof and an image-side surface 742 being convex in a paraxial region thereof, which are both aspheric, and the fourth lens element 740 is made of plastic material. Furthermore, the image-side surface 742 of the fourth lens element 740 has at least one critical point.

The fifth lens element 750 with negative refractive power has an object-side surface 751 being concave in a paraxial region thereof and an image-side surface 752 being concave in a paraxial region thereof, which are both aspheric, and the fifth lens element 750 is made of plastic material. Furthermore, the image-side surface 752 of the fifth lens element 750 has at least one convex shape in an off-axis region thereof.

The imaging lens system further includes a stop 700 disposed between an imaged object and the first lens element 710 and an IR-cut filter 760. The IR-cut filter 760 is made of glass and located between the fifth lens element 750 and an image surface 770, and will not affect the focal length of the imaging lens system.

The image sensor 780 is disposed on or near the image surface 770 of the imaging lens system.

The detailed optical data of the seventh embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(Embodiment 7)
f = 3.44 mm, Fno = 2.26, HFOV = 39.9 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.260 | | | | |
| 2 | Lens 1 | 1.218 | ASP | 0.452 | Plastic | 1.544 | 55.9 | 2.65 |
| 3 | | 6.812 | ASP | 0.054 | | | | |
| 4 | Lens 2 | 9.540 | ASP | 0.235 | Plastic | 1.639 | 23.5 | −5.39 |
| 5 | | 2.506 | ASP | 0.298 | | | | |
| 6 | Lens 3 | 10.274 | ASP | 0.242 | Plastic | 1.639 | 23.5 | −115.16 |
| 7 | | 8.932 | ASP | 0.376 | | | | |
| 8 | Lens 4 | −5.359 | ASP | 0.528 | Plastic | 1.544 | 55.9 | 2.73 |
| 9 | | −1.202 | ASP | 0.519 | | | | |
| 10 | Lens 5 | −4.487 | ASP | 0.300 | Plastic | 1.544 | 55.9 | −2.19 |
| 11 | | 1.659 | ASP | 0.500 | | | | |
| 12 | IR-cut filter | Plano | | 0.210 | Glass | 1.517 | 64.2 | — |
| 13 | | Plano | | 0.216 | | | | |
| 14 | Image Surface | Plano | | — | | | | |

Note:
Reference wavelength is d-line 587.6 nm
Note:
Effective radius of the fifth surface is 0.750 mm

TABLE 19

Aspheric Coefficients

| | | | Surface # | | |
|---|---|---|---|---|---|
| | 2 | 3 | 4 | 5 | 6 |
| k = | −3.6120E+00 | −8.0689E+01 | 4.1044E+00 | −1.7157E+00 | −4.8917E+01 |
| A4 = | 2.6037E−01 | −2.2597E−01 | −3.6566E−01 | −1.0399E−01 | −3.5073E−01 |
| A6 = | −2.0987E−01 | 4.5349E−01 | 1.2337E+00 | 5.9844E−01 | 1.3240E−01 |
| A8 = | 7.8515E−01 | 5.9915E−01 | −1.3176E+00 | 1.7752E−01 | 2.0124E−01 |
| A10 = | −2.3401E+00 | −3.5241E+00 | −2.2452E−01 | −1.9440E+00 | −1.1827E+00 |
| A12 = | 3.9429E+00 | 4.6213E+00 | 7.4100E−01 | 2.1870E+00 | 2.8390E+00 |
| A14 = | −2.7413E+00 | −2.4808E+00 | | | −2.1242E+00 |

| | | | Surface # | | |
|---|---|---|---|---|---|
| | 7 | 8 | 9 | 10 | 11 |
| k = | −1.6766E+00 | 8.0000E+00 | −3.2627E+00 | 2.6229E+00 | −1.1789E+01 |
| A4 = | −2.7484E−01 | 8.1778E−03 | −2.2924E−02 | −1.9937E−01 | −1.3447E−01 |
| A6 = | 1.8222E−01 | 6.6365E−02 | 3.8024E−03 | 1.7515E−01 | 8.1767E−02 |
| A8 = | −3.2545E−01 | −1.0852E−01 | 1.6460E−01 | −8.0196E−02 | −3.7878E−02 |
| A10 = | 4.2051E−01 | 8.0889E−02 | −1.7589E−01 | 2.4967E−02 | 1.1686E−02 |
| A12 = | −1.3897E−02 | −2.8617E−02 | 7.8769E−02 | −5.0111E−03 | −2.3069E−03 |
| A14 = | −1.1186E−01 | 3.9209E−03 | −1.6936E−02 | 5.7093E−04 | 2.5804E−04 |
| A16 = | | | 1.4337E−03 | −2.7645E−05 | −1.2140E−05 |

In the 7th embodiment, the equation of the aspheric surface profiles of the aforementioned lens elements is the same as the equation of the 1st embodiment. Also, the definitions of these parameters shown in Table 20 below are the same as those stated in the 1st embodiment with corresponding values for the 7th embodiment, so an explanation in this regard will not be provided again.

Moreover, these parameters can be calculated from Table 18 and Table 19 and satisfy the conditions stated in Table 20.

TABLE 20

| 7th Embodiment | | | |
|---|---|---|---|
| f [mm] | 3.44 | |SAG41|/CT4 | 0.28 |
| Fno | 2.26 | |SAG51|/T45 | 0.99 |

TABLE 20-continued

| 7th Embodiment | | | |
|---|---|---|---|
| HFOV [deg.] | 39.9 | |R3|/f | 2.77 |
| |V2 − V3| | 0.0 | |(f1 − f4)/(f1 + f4)| | 0.01 |
| (CT2 + CT3)/CT4 | 0.90 | f3/f | −33.48 |
| (T34 + T45)/CT4 | 1.70 | f3/T12 | −2132.59 |
| ΣAT/BFL | 1.46 | f/|R5| + f/|R6| + f/|R7| | 1.36 |
| Sd/Td | 0.91 | the number of inflection points on Lens 3 | 3 |

8th Embodiment

Figure 8A:
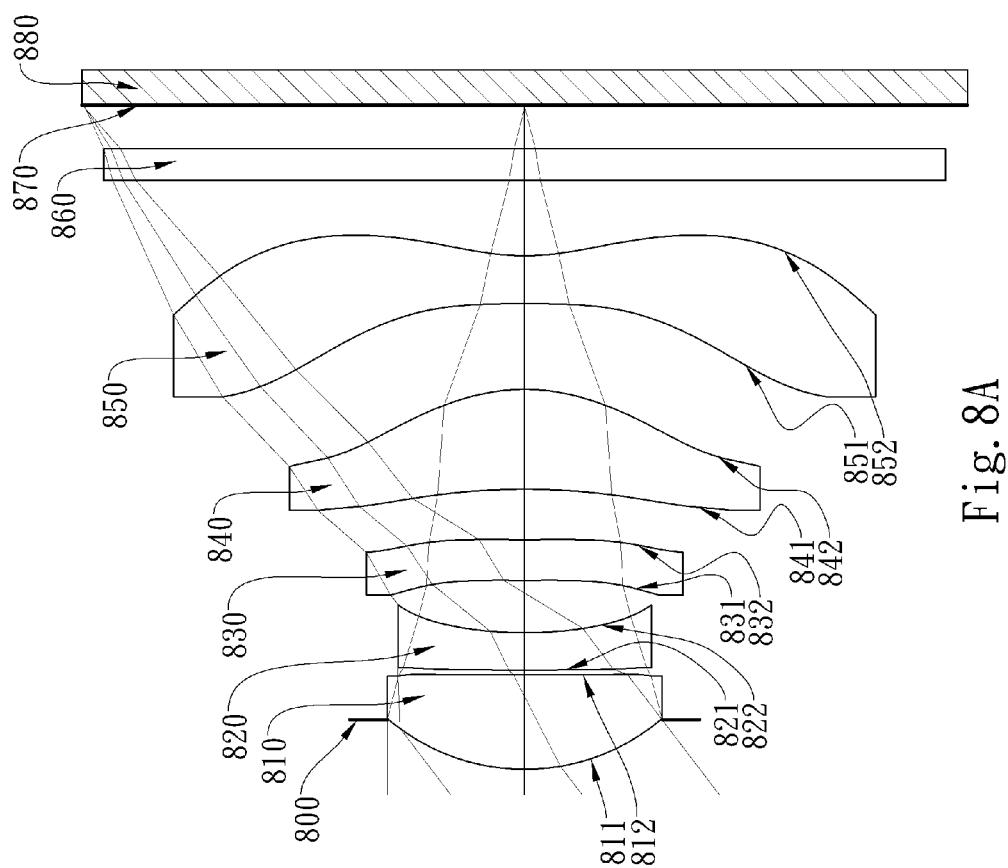
FIG. 8A is a schematic view of an image capturing device according to the 8th embodiment of the present disclosure.
Figure 8B:
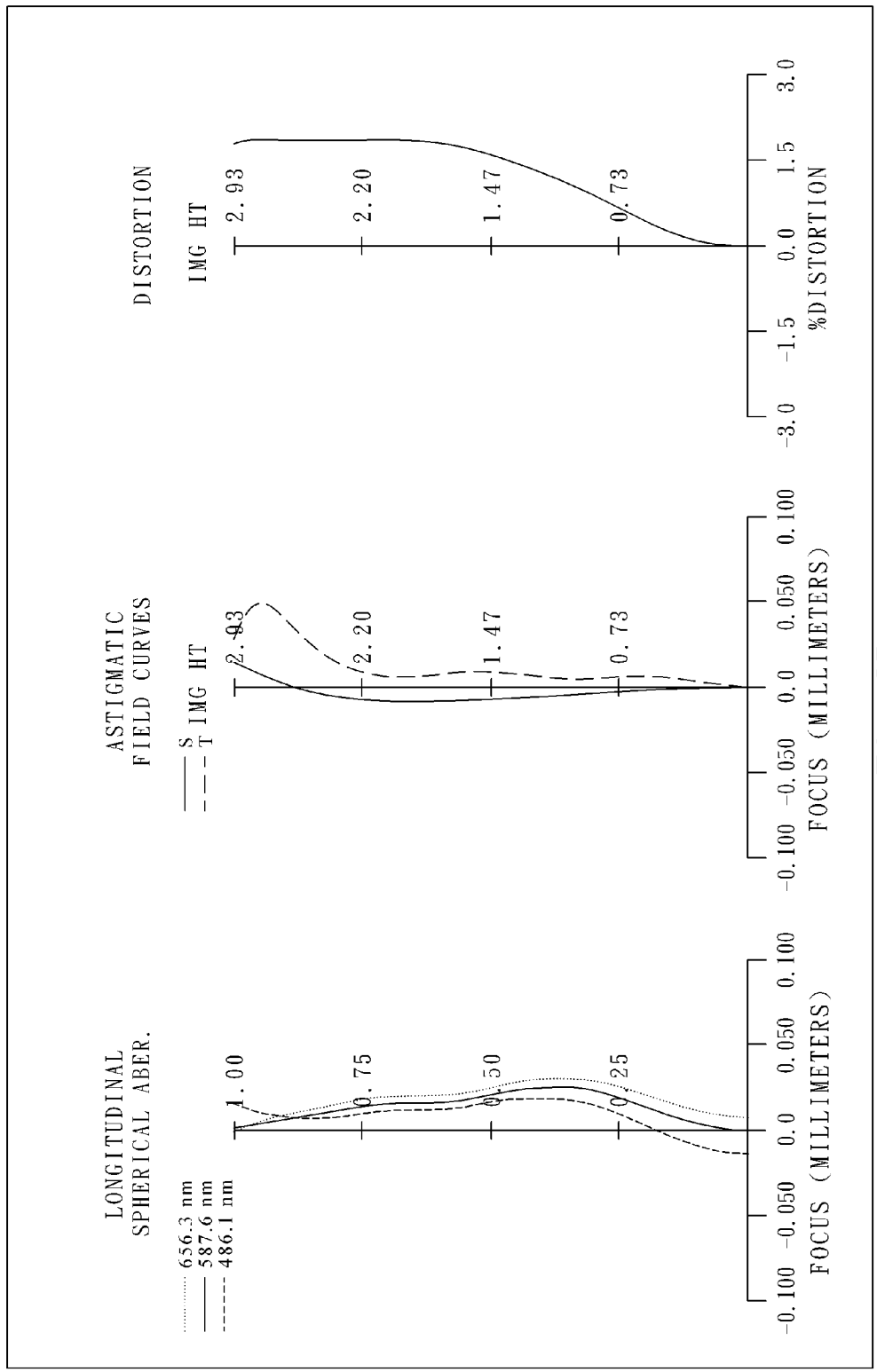
FIG. 8B shows spherical aberration curves, astigmatic field curves and a distortion curve of the image capturing device according to the 8th embodiment.

FIG. 8A is a schematic view of an image capturing device according to the 8th embodiment of the present disclosure. FIG. 8B shows, in order from left to right, spherical aberration curves, astigmatic field curves and a distortion curve of the image capturing device according to the 8th embodiment.

In FIG. 8A, the image capturing device includes the imaging lens system (not otherwise herein labeled) of the present disclosure and an image sensor 880. The imaging lens system includes, in order from an object side to an image side, a first lens element 810, a second lens element 820, a third lens element 830, a fourth lens element 840, and a fifth lens element 850, wherein the imaging lens system has a total of five lens elements with refractive power and an air gap is arranged between every two adjacent lens elements with refractive power.

The first lens element 810 with positive refractive power has an object-side surface 811 being convex in a paraxial region thereof and an image-side surface 812 being concave in a paraxial region thereof, which are both aspheric, and the first lens element 810 is made of plastic material.

The second lens element 820 with negative refractive power has an object-side surface 821 being convex in a paraxial region thereof and an image-side surface 822 being concave in a paraxial region thereof, which are both aspheric, and the second lens element 820 is made of plastic material. Furthermore, the object-side surface 821 of the second lens element 820 has at least one concave shape in an off-axis region thereof.

The third lens element 830 with negative refractive power has an object-side surface 831 being convex in a paraxial region thereof and an image-side surface 832 being concave in a paraxial region thereof, which are both aspheric, and the third lens element 830 is made of plastic material. Furthermore, the image-side surface 832 of the third lens element 830 has at least one inflection point in an off-axis region thereof.

The fourth lens element 840 with positive refractive power has an object-side surface 841 being concave in a paraxial region thereof and an image-side surface 842 being convex in a paraxial region thereof, which are both aspheric, and the fourth lens element 840 is made of plastic material. Furthermore, the image-side surface 842 of the fourth lens element 840 has at least one critical point.

The fifth lens element 850 with negative refractive power has an object-side surface 851 being concave in a paraxial region thereof and an image-side surface 852 being concave in a paraxial region thereof, which are both aspheric, and the fifth lens element 850 is made of plastic material. Furthermore, the image-side surface 852 of the fifth lens element 850 has at least one convex shape in an off-axis region thereof.

The imaging lens system further includes a stop 800 disposed between an imaged object and the first lens element 810 and an IR-cut filter 860. The IR-cut filter 860 is made of glass and located between the fifth lens element 850 and an image surface 870, and will not affect the focal length of the imaging lens system.

The image sensor 880 is disposed on or near the image surface 870 of the imaging lens system.

The detailed optical data of the eighth embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(Embodiment 8)
f = 3.76 mm, Fno = 2.06, HFOV = 37.4 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.331 | | | | |
| 2 | Lens 1 | 1.407 | ASP | 0.628 | Plastic | 1.544 | 55.9 | 2.80 |
| 3 | | 15.524 | ASP | 0.030 | | | | |
| 4 | Lens 2 | 9.476 | ASP | 0.250 | Plastic | 1.639 | 23.5 | −5.35 |
| 5 | | 2.485 | ASP | 0.348 | | | | |
| 6 | Lens 3 | 31.625 | ASP | 0.271 | Plastic | 1.639 | 23.5 | −121.83 |
| 7 | | 22.414 | ASP | 0.336 | | | | |
| 8 | Lens 4 | −4.583 | ASP | 0.665 | Plastic | 1.544 | 55.9 | 3.06 |
| 9 | | −1.283 | ASP | 0.569 | | | | |
| 10 | Lens 5 | −16.944 | ASP | 0.320 | Plastic | 1.544 | 55.9 | −2.54 |
| 11 | | 1.516 | ASP | 0.500 | | | | |
| 12 | IR-cut filter | Plano | | 0.210 | Glass | 1.517 | 64.2 | — |
| 13 | | Plano | | 0.293 | | | | |
| 14 | Image Surface | Plano | | — | | | | |

Note:
Reference wavelength is d-line 587.6 nm
Note:
Effective radius of the fifth surface is 0.840 mm

TABLE 22

Aspheric Coefficients

| | Surface # | | | | |
|---|---|---|---|---|---|
| | 2 | 3 | 4 | 5 | 6 |
| k = | −4.4032E+00 | 7.5885E+01 | −9.8296E+01 | −1.1444E+01 | −9.9000E+01 |
| A4 = | 1.9387E−01 | −2.9502E−01 | −3.4785E−01 | −2.5264E−02 | −2.5949E−01 |

TABLE 22-continued

| Aspheric Coefficients | | | | |
|---|---|---|---|---|
| A6 = | −9.0238E−02 | 1.0398E+00 | 1.4252E+00 | 5.3536E−01 | 1.2741E−01 |
| A8 = | 1.4748E−01 | −1.6442E+00 | −2.6847E+00 | −1.1695E+00 | −2.6171E−01 |
| A10 = | −3.4181E−01 | 1.4755E+00 | 3.3354E+00 | 2.1151E+00 | 4.4140E−01 |
| A12 = | 4.9152E−01 | −1.1186E+00 | −2.9759E+00 | −2.2473E+00 | −1.1403E−01 |
| A14 = | −2.7385E−01 | 4.4258E−01 | 1.2254E+00 | 1.0628E+00 | −7.5197E−02 |

| | Surface # | | | | |
|---|---|---|---|---|---|
| | 7 | 8 | 9 | 10 | 11 |
| k = | −1.5808E+00 | 6.7652E+00 | −6.1337E+00 | −1.5001E+01 | −9.1931E+00 |
| A4 = | −1.7910E−01 | 1.5558E−02 | −2.0810E−01 | −2.4038E−01 | −1.2417E−01 |
| A6 = | 5.9272E−02 | −2.1364E−02 | 2.7888E−01 | 1.7337E−01 | 6.8169E−02 |
| A8 = | −7.2068E−02 | 1.7043E−02 | −2.8434E−01 | −8.6837E−02 | −2.7917E−02 |
| A10 = | 1.2619E−01 | 2.8632E−02 | 2.1839E−01 | 3.0134E−02 | 7.2696E−03 |
| A12 = | −8.6438E−03 | −2.4850E−02 | −9.5188E−02 | −6.2797E−03 | −1.1680E−03 |
| A14 = | −2.6605E−02 | 5.0874E−03 | 2.0697E−02 | 6.9661E−04 | 1.0440E−04 |
| A16 = | | | −1.7676E−03 | −3.1629E−05 | −3.8824E−06 |

In the 8th embodiment, the equation of the aspheric surface profiles of the aforementioned lens elements is the same as the equation of the 1st embodiment. Also, the definitions of these parameters shown in Table 23 below are the same as those stated in the 1st embodiment with corresponding values for the 8th embodiment, so an explanation in this regard will not be provided again.

Moreover, these parameters can be calculated from Table 21 and Table 22 and satisfy the conditions stated in Table 23.

TABLE 23

| 8$^{th}$ Embodiment | | | |
|---|---|---|---|
| f [mm] | 3.76 | |SAG41|/CT4 | 0.21 |
| Fno | 2.06 | |SAG51|/T45 | 1.09 |
| HFOV [deg.] | 37.4 | |R3|/f | 2.52 |
| |V2 − V3| | 0.0 | |(f1 − f4)/(f1 + f4)| | 0.04 |
| (CT2 + CT3)/CT4 | 0.78 | f3/f | −32.40 |
| (T34 + T45)/CT4 | 1.36 | f3/T12 | −4061.00 |
| ΣAT/BFL | 1.38 | f/|R5| + f/|R6| + f/|R7| | 1.11 |
| Sd/Td | 0.90 | the number of inflection points on Lens 3 | 4 |

9th Embodiment

Figure 9A:
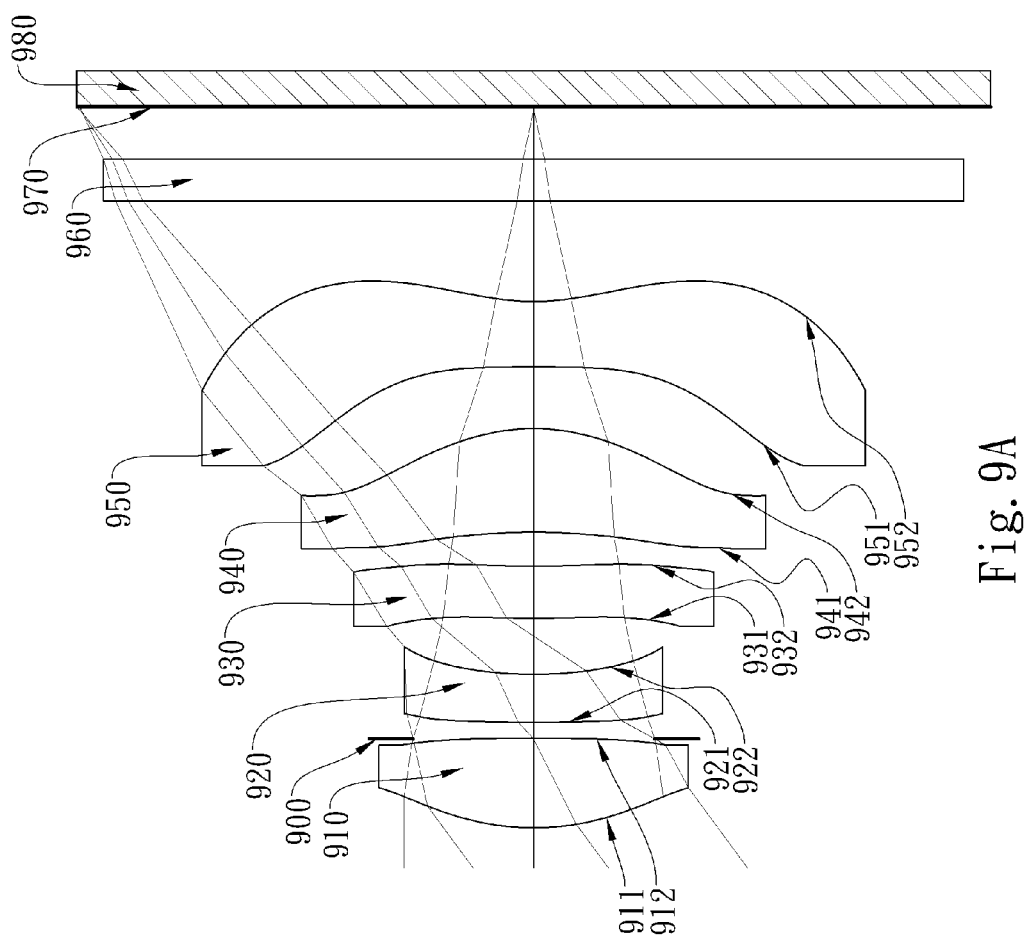
FIG. 9A is a schematic view of an image capturing device according to the 9th embodiment of the present disclosure.
Figure 9B:
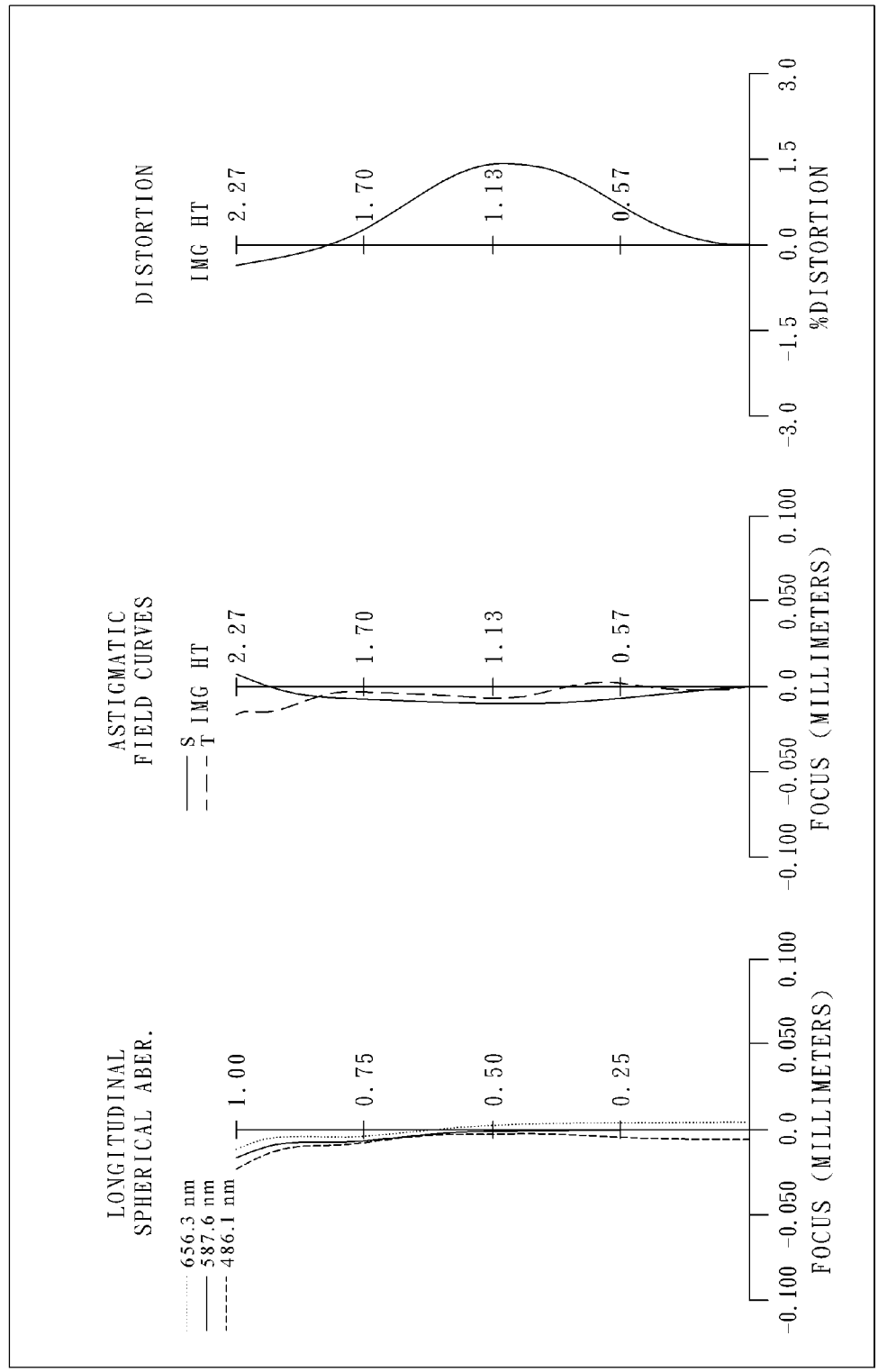
FIG. 9B shows spherical aberration curves, astigmatic field curves and a distortion curve of the image capturing device according to the 9th embodiment.

FIG. 9A is a schematic view of an image capturing device according to the 9th embodiment of the present disclosure. FIG. 9B shows, in order from left to right, spherical aberration curves, astigmatic field curves and a distortion curve of the image capturing device according to the 9th embodiment.

In FIG. 9A, the image capturing device includes the imaging lens system (not otherwise herein labeled) of the present disclosure and an image sensor 980. The imaging lens system includes, in order from an object side to an image side, a first lens element 910, a second lens element 920, a third lens element 930, a fourth lens element 940, and a fifth lens element 950, wherein the imaging lens system has a total of five lens elements with refractive power and an air gap is arranged between every two adjacent lens elements with refractive power.

The first lens element 910 with positive refractive power has an object-side surface 911 being convex in a paraxial region thereof and an image-side surface 912 being convex in a paraxial region thereof, which are both aspheric, and the first lens element 910 is made of glass.

The second lens element 920 with negative refractive power has an object-side surface 921 being convex in a paraxial region thereof and an image-side surface 922 being concave in a paraxial region thereof, which are both aspheric, and the second lens element 920 is made of plastic material. Furthermore, the object-side surface 921 of the second lens element 920 has at least one concave shape in an off-axis region thereof.

The third lens element 930 with negative refractive power has an object-side surface 931 being convex in a paraxial region thereof and an image-side surface 932 being concave in a paraxial region thereof, which are both aspheric, and the third lens element 930 is made of plastic material. Furthermore, the image-side surface 932 of the third lens element 930 has at least one inflection point in an off-axis region thereof.

The fourth lens element 940 with positive refractive power has an object-side surface 941 being concave in a paraxial region thereof and an image-side surface 942 being convex in a paraxial region thereof, which are both aspheric, and the fourth lens element 940 is made of plastic material. Furthermore, the image-side surface 942 of the fourth lens element 940 has at least one critical point.

The fifth lens element 950 with negative refractive power has an object-side surface 951 being concave in a paraxial region thereof and an image-side surface 952 being concave in a paraxial region thereof, which are both aspheric, and the fifth lens element 950 is made of plastic material. Furthermore, the image-side surface 952 of the fifth lens element 950 has at least one convex shape in an off-axis region thereof.

The imaging lens system further includes a stop 900 disposed between the first lens element 910 and the second lens element 920 and an IR-cut filter 960. The IR-cut filter 960 is made of glass and located between the fifth lens element 950 and an image surface 970, and will not affect the focal length of the imaging lens system.

The image sensor 980 is disposed on or near the image surface 970 of the imaging lens system.

The detailed optical data of the ninth embodiment are shown in TABLE 24, and the aspheric surface data are shown in TABLE 25, wherein the units of the curvature radius, the thickness and the focal length are expressed in mm, and HFOV is half of the maximal field of view.

TABLE 24

(Embodiment 9)
f = 3.10 mm, Fno = 2.40, HFOV = 36.3 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.264 | ASP | 0.447 | Glass | 1.542 | 62.9 | 2.28 |
| 2 | | −46.969 | ASP | −0.002 | | | | |
| 3 | Stop | Plano | | 0.081 | | | | |
| 4 | Lens 2 | 6.215 | ASP | 0.240 | Plastic | 1.639 | 23.5 | −4.30 |
| 5 | | 1.877 | ASP | 0.280 | | | | |
| 6 | Lens 3 | 4.603 | ASP | 0.260 | Plastic | 1.650 | 21.5 | −90.88 |
| 7 | | 4.175 | ASP | 0.170 | | | | |
| 8 | Lens 4 | −3.448 | ASP | 0.518 | Plastic | 1.544 | 55.9 | 2.44 |
| 9 | | −1.008 | ASP | 0.307 | | | | |
| 10 | Lens 5 | −122.932 | ASP | 0.328 | Plastic | 1.535 | 55.7 | −2.16 |
| 11 | | 1.168 | ASP | 0.500 | | | | |
| 12 | IR-cut filter | Plano | | 0.210 | Glass | 1.517 | 64.2 | — |
| 13 | | Plano | | 0.261 | | | | |
| 14 | Image Surface | Plano | | — | | | | |

Note:
Reference wavelength is d-line 587.6 nm

TABLE 25

Aspheric Coefficients

| Surface # | | | | | |
|---|---|---|---|---|---|
| | 1 | 2 | 4 | 5 | 6 |
| k = | −3.8075E+00 | −9.4348E+01 | −9.9000E+01 | −1.3576E+01 | −9.9000E+01 |
| A4 = | 1.7611E−01 | −3.1147E−01 | −2.8079E−01 | 1.8589E−02 | −3.7944E−01 |
| A6 = | −2.0161E−01 | 9.0059E−01 | 1.6954E+00 | 1.1949E+00 | 1.0348E+00 |
| A8 = | 6.7898E−03 | −1.8436E+00 | −2.6553E+00 | −2.9934E+00 | 1.2290E−01 |
| A10 = | −3.3441E−01 | 1.6676E+00 | 2.4578E+00 | 8.8668E+00 | 8.4576E−02 |
| A12 = | 3.9061E−01 | −2.0304E−01 | −2.1237E+00 | −1.7892E+01 | 1.2476E+00 |
| A14 = | −2.8069E−01 | −7.1800E−01 | 2.7900E+00 | 1.6463E+01 | −2.4544E+00 |

| Surface # | | | | | |
|---|---|---|---|---|---|
| | 7 | 8 | 9 | 10 | 11 |
| k = | −7.3564E+01 | −2.9247E+00 | −4.2687E+00 | −9.9000E+01 | −8.0733E+00 |
| A4 = | −2.6295E−01 | −3.8621E−02 | −2.7734E−01 | −5.3295E−01 | −2.7405E−01 |
| A6 = | 2.0798E−02 | 1.9426E−01 | 6.1601E−01 | 5.5581E−01 | 2.0488E−01 |
| A8 = | 2.4777E−01 | −9.2634E−01 | −1.2493E+00 | −6.2157E−01 | −1.3603E−01 |
| A10 = | −2.7695E−03 | 3.2468E+00 | 2.0264E+00 | 4.9592E−01 | 5.4579E−02 |
| A12 = | 1.2937E−01 | −4.9098E+00 | −1.6820E+00 | −2.0950E−01 | −1.1766E−02 |
| A14 = | −3.2236E−01 | 3.4521E+00 | 6.6274E−01 | 4.4630E−02 | 9.9947E−04 |
| A16 = | | −9.6229E−01 | −1.0081E−01 | −4.0987E−03 | −7.4416E−06 |

In the 9th embodiment, the equation of the aspheric surface profiles of the aforementioned lens elements is the same as the equation of the 1st embodiment. Also, the definitions of these parameters shown in Table 26 below are the same as those stated in the 1st embodiment with corresponding values for the 9th embodiment, so an explanation in this regard will not be provided again.

Moreover, these parameters can be calculated from Table 24 and Table 25 and satisfy the conditions stated in Table 26.

TABLE 26

| 9th Embodiment | | | |
|---|---|---|---|
| f [mm] | 3.10 | \|SAG41\|/CT4 | 0.16 |
| Fno | 2.40 | \|SAG51\|/T45 | 1.61 |
| HFOV [deg.] | 36.3 | \|R3\|/f | 2.00 |
| \|V2 − V3\| | 2.0 | \|(f1 − f4)/(f1 + f4)\| | 0.03 |
| (CT2 + CT3)/CT4 | 0.97 | f3/f | −29.32 |

TABLE 26-continued

| 9th Embodiment | | | |
|---|---|---|---|
| (T34 + T45)/CT4 | 0.92 | f3/T12 | −1150.38 |
| ΣAT/BFL | 0.93 | f/\|R5\| + f/\|R6\| + f/\|R7\| | 2.32 |
| Sd/Td | 0.83 | the number of inflection points on Lens 3 | 2 |

10th Embodiment

Figure 10A:
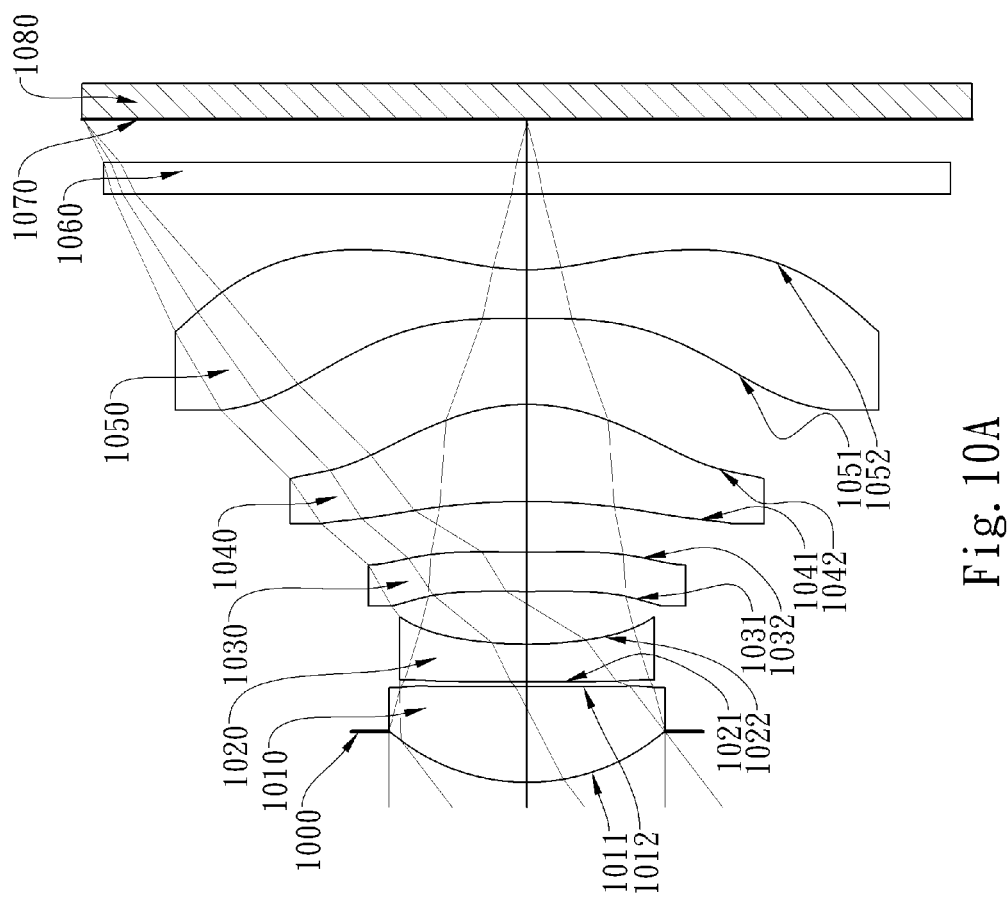
FIG. 10A is a schematic view of an image capturing device according to the 10th embodiment of the present disclosure.
Figure 10B:
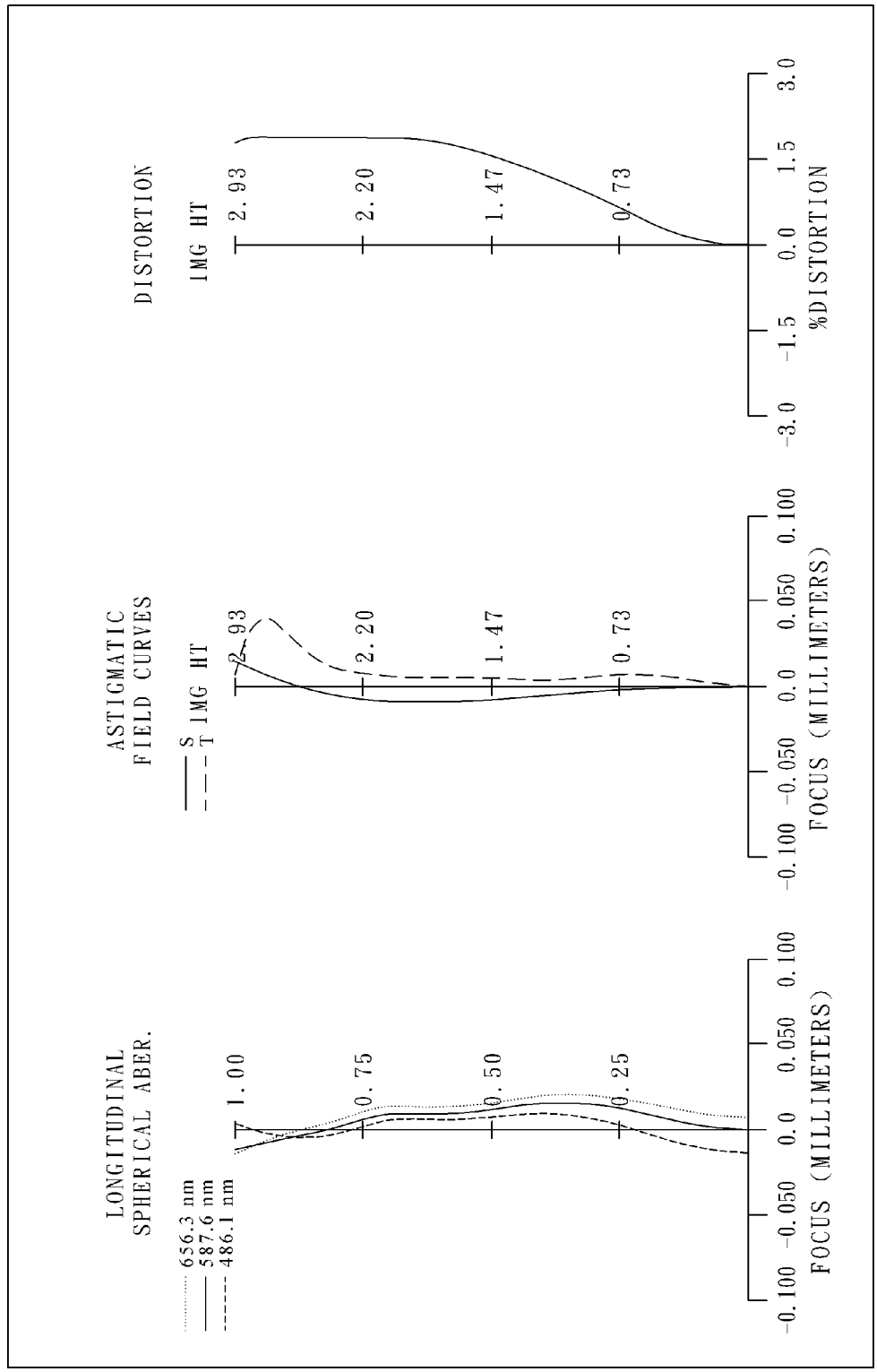
FIG. 10B shows spherical aberration curves, astigmatic field curves and a distortion curve of the image capturing device according to the 10th embodiment.

FIG. 10A is a schematic view of an image capturing device according to the 10th embodiment of the present disclosure. FIG. 10B shows, in order from left to right, spherical aberration curves, astigmatic field curves and a distortion curve of the image capturing device according to the 10th embodiment.

In FIG. 10A, the image capturing device includes the imaging lens system (not otherwise herein labeled) of the present disclosure and an image sensor 1080. The imaging lens system includes, in order from an object side to an image side, a first lens element 1010, a second lens element 1020, a third lens element 1030, a fourth lens element 1040, and a fifth lens element 1050, wherein the imaging lens system has a total of five lens elements with refractive power and an air gap is arranged between every two adjacent lens elements with refractive power.

The first lens element 1010 with positive refractive power has an object-side surface 1011 being convex in a paraxial region thereof and an image-side surface 1012 being concave in a paraxial region thereof, which are both aspheric, and the first lens element 1010 is made of plastic material.

The second lens element 1020 with negative refractive power has an object-side surface 1021 being convex in a paraxial region thereof and an image-side surface 1022 being concave in a paraxial region thereof, which are both aspheric, and the second lens element 1020 is made of plastic material. Furthermore, the object-side surface 1021 of the second lens element 1020 has at least one concave shape in an off-axis region thereof.

The third lens element 1030 with negative refractive power has an object-side surface 1031 being convex in a paraxial region thereof and an image-side surface 1032 being concave in a paraxial region thereof, which are both aspheric, and the third lens element 1030 is made of plastic material. Furthermore, the image-side surface 1032 of the third lens element 1030 has at least one inflection point in an off-axis region of.

The fourth lens element 1040 with positive refractive power has an object-side surface 1041 being concave in a paraxial region thereof and an image-side surface 1042 being convex in a paraxial region thereof, which are both aspheric, and the fourth lens element 1040 is made of plastic material. Furthermore, the image-side surface 1042 of the fourth lens element 1040 has at least one critical point.

The fifth lens element 1050 with negative refractive power has an object-side surface 1051 being concave in a paraxial region thereof and an image-side surface 1052 being concave in a paraxial region thereof, which are both aspheric, and the fifth lens element 1050 is made of plastic material. Furthermore, the image-side surface 1052 of the fifth lens element 1050 has at least one convex shape in an off-axis region thereof.

The imaging lens system further includes a stop 1000 disposed between an imaged object and the first lens element 1010 and an IR-cut filter 1060. The IR-cut filter 1060 is made of glass and located between the fifth lens element 1050 and an image surface 1070, and will not affect the focal length of the imaging lens system.

The image sensor 1080 is disposed on or near the image surface 1070 of the imaging lens system.

The detailed optical data of the tenth embodiment are shown in TABLE 27, and the aspheric surface data are shown in TABLE 28, wherein the units of the curvature radius, the thickness and the focal length are expressed in mm, and HFOV is half of the maximal field of view.

TABLE 27

(Embodiment 10)
f = 3.76 mm, Fno = 2.06, HFOV = 37.4 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.334 | | | | |
| 2 | Lens 1 | 1.402 | ASP | 0.633 | Plastic | 1.544 | 55.9 | 2.79 |
| 3 | | 15.563 | ASP | 0.030 | | | | |
| 4 | Lens 2 | 11.047 | ASP | 0.250 | Plastic | 1.639 | 23.5 | −5.28 |
| 5 | | 2.563 | ASP | 0.349 | | | | |
| 6 | Lens 3 | 18.373 | ASP | 0.260 | Plastic | 1.639 | 23.5 | −126.06 |
| 7 | | 14.878 | ASP | 0.336 | | | | |
| 8 | Lens 4 | −4.568 | ASP | 0.643 | Plastic | 1.544 | 55.9 | 3.09 |
| 9 | | −1.290 | ASP | 0.569 | | | | |
| 10 | Lens 5 | −21.039 | ASP | 0.322 | Plastic | 1.544 | 55.9 | −2.55 |
| 11 | | 1.496 | ASP | 0.500 | | | | |
| 12 | IR-cut filter | Plano | | 0.210 | Glass | 1.517 | 64.2 | 64.20 |
| 13 | | Plano | | 0.287 | | | | |
| 14 | Image Surface | Plano | | — | | | | |

Note:
Reference wavelength is d-line 587.6 nm
Note:
Effective radius of the fifth surface is 0.840 mm

TABLE 28

Aspheric Coefficients

| | Surface # | | | | |
|---|---|---|---|---|---|
| | 2 | 3 | 4 | 5 | 6 |
| k = | −4.2039E+00 | 8.3188E+01 | −7.6210E+01 | −1.2084E+01 | −9.3234E+01 |
| A4 = | 1.9047E−01 | −2.9674E−01 | −3.4885E−01 | −2.3087E−02 | −2.6130E−01 |
| A6 = | −9.0453E−02 | 1.0468E+00 | 1.4228E+00 | 5.3438E−01 | 3.4606E−02 |
| A8 = | 1.5325E−01 | −1.6318E+00 | −2.6638E+00 | −1.1724E+00 | 7.7821E−02 |
| A10 = | −3.4586E−01 | 1.4468E+00 | 3.3134E+00 | 2.1108E+00 | −2.6496E−01 |
| A12 = | 4.9613E−01 | −1.1081E+00 | −2.9818E+00 | −2.2345E+00 | 6.2434E−01 |

TABLE 28-continued

| Aspheric Coefficients | | | | |
|---|---|---|---|---|
| A14 = −2.7585E−01 | 4.3784E−01 | 1.2262E+00 | 1.0610E+00 | −3.6078E−01 |
| A16 = | | | | |

| Surface # | | | | |
|---|---|---|---|---|
| 7 | 8 | 9 | 10 | 11 |
| k = −9.7081E+01 | 6.5162E+00 | −6.1993E+00 | −1.5001E+01 | −9.1931E+00 |
| A4 = −1.7829E−01 | 2.2195E−02 | −2.0718E−01 | −2.6035E−01 | −1.3385E−01 |
| A6 = −9.2419E−03 | −1.7825E−02 | 2.9375E−01 | 1.9659E−01 | 7.7089E−02 |
| A8 = 9.2797E−02 | −1.8026E−02 | −3.1188E−01 | −1.0158E−01 | −3.2512E−02 |
| A10 = −1.2930E−01 | 7.5121E−02 | 2.5013E−01 | 3.5846E−02 | 8.6901E−03 |
| A12 = 2.0617E−01 | −5.3691E−02 | −1.1487E−01 | −7.5778E−03 | −1.4319E−03 |
| A14 = −9.4100E−02 | 1.4046E−02 | 2.6579E−02 | 8.5433E−04 | 1.3097E−04 |
| A16 = | −1.1628E−03 | −2.4417E−03 | −3.9516E−05 | −4.9582E−06 |

In the 10th embodiment, the equation of the aspheric surface profiles of the aforementioned lens elements is the same as the equation of the 1st embodiment. Also, the definitions of these parameters shown in Table 29 below are the same as those stated in the 1st embodiment with corresponding values for the 10th embodiment, so an explanation in this regard will not be provided again.

Moreover, these parameters can be calculated from Table 27 and Table 28 and satisfy the conditions stated in Table 29.

TABLE 29

| 10$^{th}$ Embodiment | | | |
|---|---|---|---|
| f [mm] | 3.76 | |SAG41|/CT4 | 0.23 |
| Fno | 2.06 | |SAG51|/T45 | 1.07 |
| HFOV [deg.] | 37.4 | |R3|/f | 2.94 |
| |V2 − V3| | 0.0 | |(f1 − f4)/(f1 + f4)| | 0.05 |
| (CT2 + CT3)/CT4 | 0.79 | f3/f | −33.53 |
| (T34 + T45)/CT4 | 1.41 | f3/T12 | −4202.00 |
| ΣAT/BFL | 1.39 | f/|R5| + f/|R6| + f/|R7| | 1.28 |
| Sd/Td | 0.90 | the number of inflection points on Lens 3 | 4 |

The foregoing description, for purpose of explanation, has been described with reference to specific embodiments. It is to be noted that TABLES 1-29 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, comprising, in order from an object side to an image side:
   a first lens element with positive refractive power having an object-side surface being convex in a paraxial region thereof;
   a second lens element with negative refractive power having an object-side surface being convex in a paraxial region thereof and an image-side surface being concave in a paraxial region thereof;
   a third lens element with negative refractive power having an image-side surface being concave in a paraxial region thereof, an object-side surface and the image-side surface thereof being aspheric, the image-side surface having at least one inflection point in an off-axis region thereof;
   a fourth lens element with positive refractive power having an object-side surface being concave in a paraxial region thereof and an image-side surface being convex in a paraxial region thereof, the object-side surface and the image-side surface thereof being aspheric; and
   a fifth lens element with negative refractive power having an object-side surface being concave in a paraxial region thereof and an image-side surface being concave in a paraxial region thereof, the object-side surface and the image-side surface thereof being aspheric, the image-side surface having at least one convex shape in an off-axis region thereof; wherein the imaging lens system has a total of five lens element with refractive power and an air gap is arranged between every two adjacent lens elements with refractive power;
   wherein an Abbe number of the second lens element is V2, an Abbe number of the third lens element is V3, a curvature radius of the object-side surface of the second lens element is R3, a focal length of the imaging lens system is f, an axial distance between the third lens element and the fourth lens element is T34, an axial distance between the fourth lens element and the fifth lens element is T45, a central thickness of the fourth lens element is CT4, and the following conditions are satisfied:

$|V2-V3|<10;$ $|R3|/f<4.0;$ and $1.15<(T34+T45)/CT4<2.0.$

2. The imaging lens system of claim 1, wherein the first lens element has an image-side surface being concave in a paraxial region thereof.

3. The imaging lens system of claim 2, wherein the image-side surface of the fourth lens element has at least one critical point.

4. The imaging lens system of claim 2, wherein a focal length of the first lens element is f1, a focal length of the fourth lens element is f4, and the following condition is satisfied:

$|(f1-f4)/(f1+f4)|<0.15.$

5. The imaging lens system of claim 2, wherein the focal length of the imaging lens system is f, a curvature radius of the object-side surface of the third lens element is R5, a curvature radius of the image-side surface of the third lens element is R6, a curvature radius of the object-side surface of the fourth lens element is R7, and the following condition is satisfied:

$f/|R5|+f/|R6|+f/|R7|<1.50.$

6. The imaging lens system of claim 5, wherein a focal length of the third lens element is f3, an axial distance between the first lens element and the second lens element is T12, and the following condition is satisfied:

$f3/T12<-1000.$

7. The imaging lens system of claim 5, wherein the third lens element has negative refractive power at a peripheral region thereof.

8. The imaging lens system of claim 1 further comprising a stop, wherein an axial distance between the stop and the image-side surface of the fifth lens element is Sd, an axial distance between the object-side surface of the first lens element and the image-side surface of the fifth lens element is Td, the focal length of the imaging lens system is f, and the following condition is satisfied:

$0.87<Sd/Td<0.98;$ and $2.8 \text{ mm}<f<4.2 \text{ mm}.$

9. The imaging lens system of claim 8, wherein the fifth lens element has positive refractive power at a peripheral region thereof.

10. The imaging lens system of claim 9, wherein the focal length of the imaging lens system is f, the focal length of the third lens element is f3, and the following condition is satisfied:

$f3/f<-10.$

11. The imaging lens system of claim 10, wherein an equivalent air distance between the image-side surface of the fifth lens element and an image surface is BFL, a total axial distance of the air gaps between every two adjacent lens elements with refractive power is ΣAT, and the following condition is satisfied:

$1.1<\Sigma AT/BFL<1.75.$

12. The imaging lens system of claim 1, wherein the curvature radius of the object-side surface of the second lens element is R3, the focal length of the imaging lens system is f, and the following condition is satisfied:

$|R3|/f<3.0.$

13. The imaging lens system of claim 1, wherein a distance in parallel with an optical axis from an axial vertex on the object-side surface of the fourth lens element to a maximum effective diameter position on the object-side surface of the fourth lens element is SAG41, the central thickness of the fourth lens element is CT4, and the following condition is satisfied:

$|SAG41|/CT4<0.25.$

14. The imaging lens system of claim 1, wherein the third lens element has at least three inflection points.

15. The imaging lens system of claim 1, wherein the object-side surface of the second lens element has at least one concave shape in an off-axis region thereof.

16. The imaging lens system of claim 15, wherein a distance in parallel with an optical axis from an axial vertex on the object-side surface of the fifth lens element to a maximum effective diameter position on the object-side surface of the fifth lens element is SAG51, the axial distance between the fourth lens element and the fifth lens element is T45, and the following condition is satisfied:

$0.80<|SAG51|/T45<1.10.$

17. The imaging lens system of claim 16, wherein a central thickness of the second lens element is CT2, a central thickness of the third lens element is CT3, the central thickness of the fourth lens element is CT4, and the following condition is satisfied:

$0.70<(CT2+CT3)/CT4<1.00.$

18. An image capturing device comprising:
the imaging lens system of claim 1; and
an image sensor, wherein the image sensor is disposed on an image surface of the imaging lens system.

19. An imaging lens system, comprising, in order from an object side to an image side:
a first lens element with positive refractive power having an object-side surface being convex in a paraxial region thereof;
a second lens element with negative refractive power having an object-side surface being convex in a paraxial region thereof and an image-side surface being concave in a paraxial region thereof;
a third lens element with negative refractive power having an object-side surface being convex in a paraxial region thereof and an image-side surface being concave in a paraxial region thereof, an object-side surface and the image-side surface thereof being aspheric, the image-side surface having at least one inflection point in an off-axis region thereof;
a fourth lens element with positive refractive power having an object-side surface being concave in a paraxial region thereof and an image-side surface being convex in a paraxial region thereof, the object-side surface and the image-side surface thereof being aspheric; and
a fifth lens element with negative refractive power having an object-side surface being concave in a paraxial region thereof and an image-side surface being concave in a paraxial region thereof, the object-side surface and the image-side surface thereof being aspheric, the image-side surface having at least one convex shape in an off-axis region thereof;
wherein the imaging lens system has a total of five lens element with refractive power and an air gap is arranged between every two adjacent lens elements with refractive power; wherein an Abbe number of the second lens element is V2, an Abbe number of the third lens element is V3, a curvature radius of the object-side surface of the second lens element is R3, a focal length of the imaging lens system is f, an axial distance between the third lens element and the fourth lens element is T34, an axial distance between the fourth lens element and the fifth lens element is T45, a central thickness of the fourth lens element is CT4, and the following conditions are satisfied:

$|V2-V3|<10;$ $|R3|/f<4.0;$ and $0.85<(T34+T45)/CT4.$

20. The imaging lens system of claim 19, wherein the first lens element has an image-side surface being concave in a paraxial region thereof.

21. The imaging lens system of claim 20, wherein the image-side surface of the fourth lens element has at least one critical point.

22. The imaging lens system of claim 20, wherein a focal length of the first lens element is f1, a focal length of the fourth lens element is f4, and the following condition is satisfied:

$|(f1-f4)/(f1+f4)|<0.15.$

23. The imaging lens system of claim 20, wherein the focal length of the imaging lens system is f, a curvature radius of the object-side surface of the third lens element is R5, a curvature radius of the image-side surface of the third lens element is R6, a curvature radius of the object-side surface of the fourth lens element is R7, and the following condition is satisfied:

$f/|R5|+f/|R6|+f/|R7|<1.50.$

24. The imaging lens system of claim 23, wherein a focal length of the third lens element is f3, an axial distance between the first lens element and the second lens element is T12, and the following condition is satisfied:

$f3/T12<-1000.$

25. The imaging lens system of claim 23, wherein the third lens element has negative refractive power at a peripheral region thereof.

26. The imaging lens system of claim 19, wherein the axial distance between the third lens element and the fourth lens element is T34, the axial distance between the fourth lens element and the fifth lens element is T45, the central thickness of the fourth lens element is CT4, and they further satisfy the following condition:

$1.15<(T34+T45)/CT4<2.0.$

27. The imaging lens system of claim 26 further comprising a stop, wherein an axial distance between the stop and the image-side surface of the fifth lens element is Sd, an axial distance between the object-side surface of the first lens element and the image-side surface of the fifth lens element is Td, the focal length of the imaging lens system is f, and the following condition is satisfied:

$0.87<Sd/Td<0.98;$ and $2.8 \text{ mm}<f<4.2 \text{ mm}.$

28. The imaging lens system of claim 27, wherein the fifth lens element has positive refractive power at a peripheral region thereof.

29. The imaging lens system of claim 28, wherein the focal length of the imaging lens system is f, the focal length of the third lens element is f3, and the following condition is satisfied:

$f3/f<-10.$

30. The imaging lens system of claim 29, wherein an equivalent air distance between the image-side surface of the fifth lens element and an image surface is BFL, a total axial distance of the air gaps between every two adjacent lens elements with refractive power is ΣAT, and the following condition is satisfied:

$1.1<\Sigma AT/BFL<1.75.$

31. The imaging lens system of claim 19, wherein the curvature radius of the object-side surface of the second lens element is R3, the focal length of the imaging lens system is f, and the following condition is satisfied:

$|R3|/f<3.0.$

32. The imaging lens system of claim 19, wherein a distance in parallel with an optical axis from an axial vertex on the object-side surface of the fourth lens element to a maximum effective diameter position on the object-side surface of the fourth lens element is SAG41, the central thickness of the fourth lens element is CT4, and the following condition is satisfied:

$|SAG41|/CT4<0.25.$

33. The imaging lens system of claim 19, wherein the third lens element has at least three inflection points.

34. The imaging lens system of claim 19, wherein the object-side surface of the second lens element has at least one concave shape in an off-axis region thereof.

35. The imaging lens system of claim 24, wherein a distance in parallel with an optical axis from an axial vertex on the object-side surface of the fifth lens element to a maximum effective diameter position on the object-side surface of the fifth lens element is SAG51, the axial distance between the fourth lens element and the fifth lens element is T45, and the following condition is satisfied:

$0.80<|SAG51|/T45<1.10.$

36. The imaging lens system of claim 25, wherein a central thickness of the second lens element is CT2, a central thickness of the third lens element is CT3, the central thickness of the fourth lens element is CT4, and the following condition is satisfied:

$0.70<(CT2+CT3)/CT4<1.00.$

37. An image capturing device comprising:
the imaging lens system of claim 19; and
an image sensor, wherein the image sensor is disposed on an image surface of the imaging lens system.

* * * * *